United States Patent [19]

Austin

[11] Patent Number: 4,959,828

[45] Date of Patent: Sep. 25, 1990

[54] MULTI-CHANNEL INFRARED CABLELESS COMMUNICATION SYSTEM

[75] Inventor: Lawrence C. Austin, Orem, Utah

[73] Assignee: Corporation of the President of the Church of Jesus Christ of Latter-Day Saints, Salt Lake City, Utah

[21] Appl. No.: 201,581

[22] Filed: May 31, 1988

[51] Int. Cl.$^5$ .................. H04J 14/08; H04B 10/24
[52] U.S. Cl. ........................... 370/4; 455/607; 455/617
[58] Field of Search ............. 455/606, 607, 603, 617, 455/618, 619, 608; 370/4

[56] References Cited

U.S. PATENT DOCUMENTS

| | | | |
|---|---|---|---|
| 3,727,061 | 4/1973 | Dworkin | 331/45 |
| 4,345,273 | 8/1982 | Barabas | 370/58 |
| 4,386,424 | 5/1983 | Christiansen | 370/4 |
| 4,393,515 | 7/1988 | deNeumann | 455/608 |
| 4,402,090 | 8/1983 | Gfeller | 455/601 |
| 4,450,319 | 5/1984 | Lucey | 455/614 |
| 4,473,901 | 9/1984 | Jensen | 370/100 |
| 4,475,187 | 10/1984 | Barabas | 370/58 |
| 4,543,665 | 9/1985 | Sotelo | |
| 4,584,720 | 4/1986 | Garrett | 455/608 |
| 4,628,493 | 12/1986 | Nelson | 370/4 |
| 4,682,323 | 7/1987 | Corfield | 370/4 |
| 4,703,471 | 10/1987 | Fitelson | 370/1 |

FOREIGN PATENT DOCUMENTS

| | | | |
|---|---|---|---|
| 2823931 | 12/1979 | Fed. Rep. of Germany | 370/4 |
| 3127669 | 1/1983 | German Democratic Rep. | 370/4 |
| 0082596 | 6/1980 | Japan | 370/4 |

OTHER PUBLICATIONS

Kato, "High Quality Broadband Optical Communications by TDM-PAM: Nonlinearity in Laser Diodes", IEEE Journal of Quantum Mechanics, vol. QE-14, No. 5, May 78, pp. 343-346.

Miller, "Optically Powered Speech Communication over a Fiber Lightguide", Bell System Tech. Journal, vol. 58, No. 7, 9-98, pp. 1735-1741.

Griese, "Conference System Using Infra Red Light Techniques", Journal of Audio Engineering Society, 6-79, vol. 27, #6, pp. 503-506.

Ankermann, "Transmissions of Audio Signals by Infrared Light Carriers", SMPTE Journal, 11-80, vol. 89, pp. 834-837.

Primary Examiner—Joseph A. Orsino
Assistant Examiner—L. van Beek

[57] ABSTRACT

A system for simultaneously transmitting a plurality of audio signals into a transmission space from at least one transmission point to one or more reception points. The plurality of audio signals is inputted to an encoder. The encoder time-division multiplexes and samples the audio signals to generate an encoded pulse amplitude modulated signal. The encoded pulse amplitude modulated signal is converted into a corresponding encoded pulse position modulated signal. A sync pulse is then added to the encoded pulse position modulated signal to form an encoded composite signal. The encoded composite signal is broadcast into the transmission space as an optical signal, preferably in the infrared portion of the spectrum. The optical signal is received by at least one receiver located in the transmission space. Each of the receivers receives the optical signal and generates a received pulse position modulated signal. A portion of the pulse position modulated signal which contains a selected one of the plurality of audio signals is converted into a pulse amplitude modulated signal. The pulse amplitude modulated signal is then converted into a corresponding audio signal which is presented to a user. Preferably each receiver is completely portable and may be carried about by the user. The user preferably hears the selected audio signal by way of headphones included with the receiver. One particular application of the disclosed system is where verbal translation of a speaker's words must simultaneously occur in several languages and all of those translations are conveyed to listeners who individually select one of the translations to listen to.

40 Claims, 22 Drawing Sheets

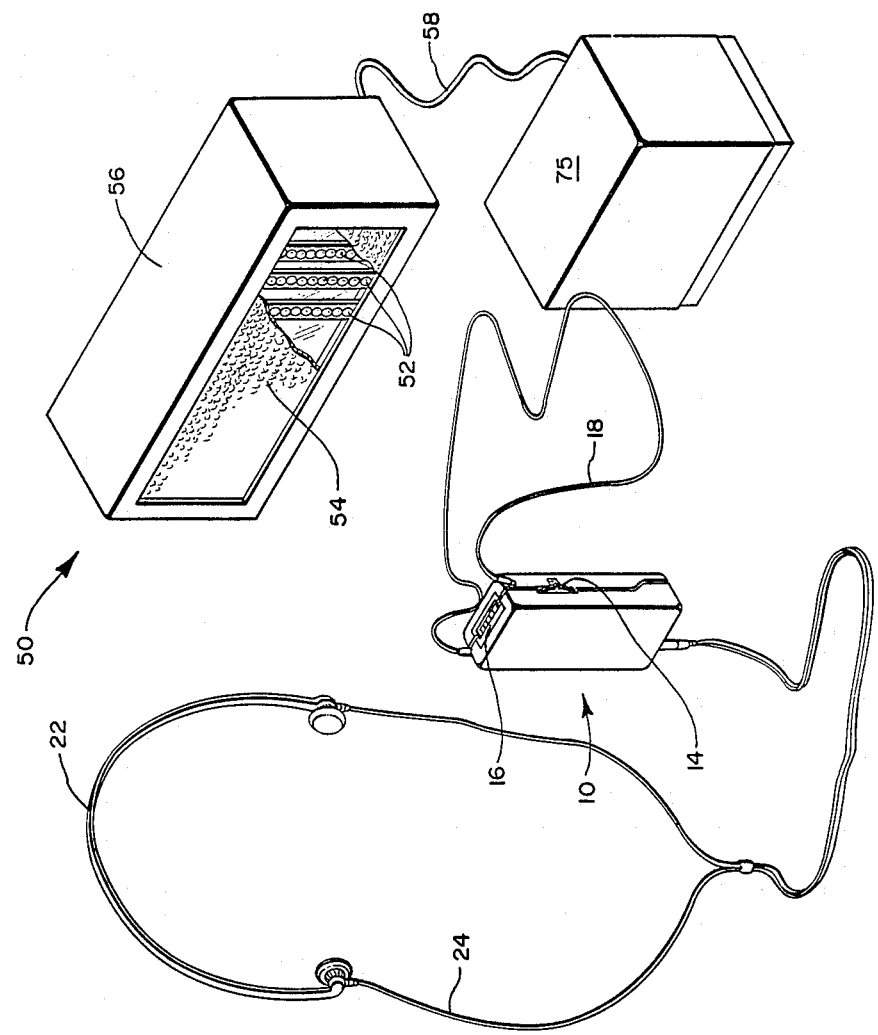
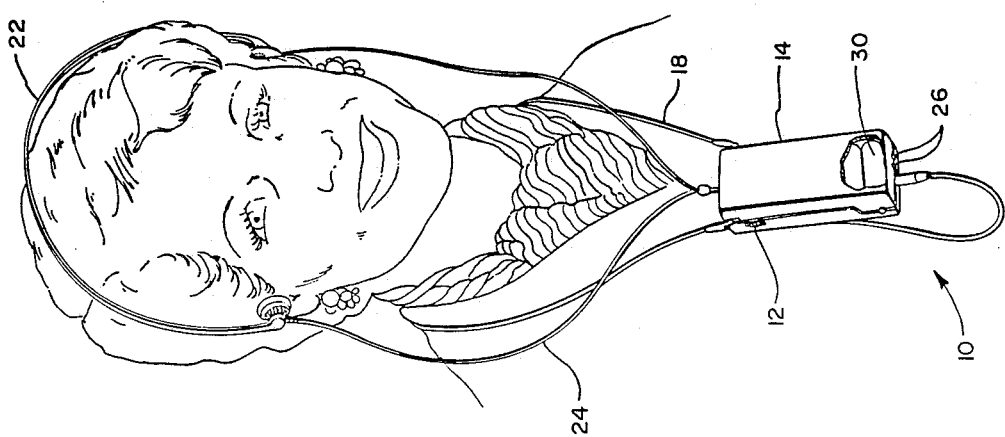
FIG. 1B
FIG. 1A

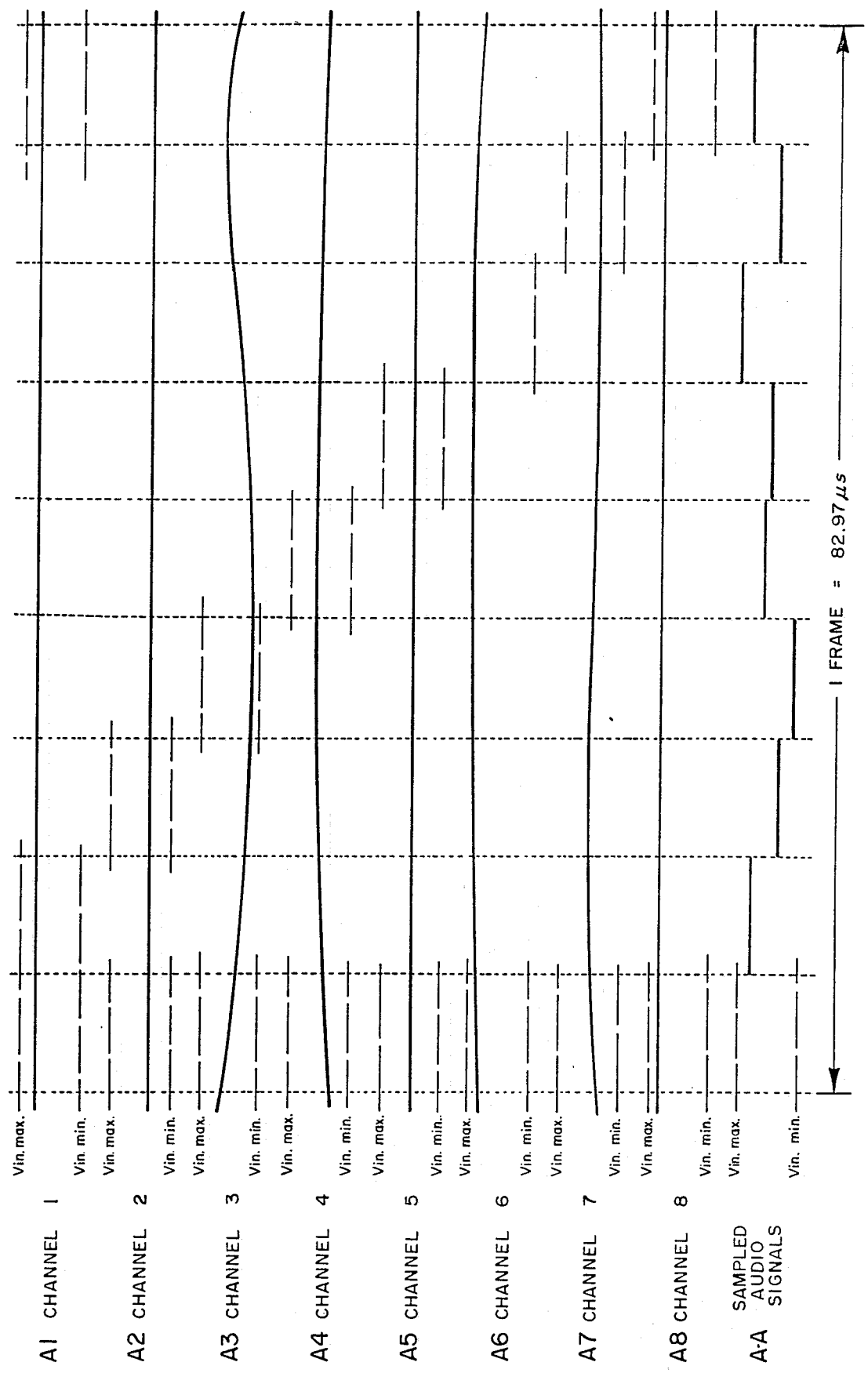

MULTI-CHANNEL INFRARED CABLELESS COMMUNICATION SYSTEM

BACKGROUND

1. The Field of the Invention

This invention generally relates to systems and methods for broadcasting audio information from at least one transmission point to one or more reception points within a limited transmission space. More particularly, the present invention is directed to a system and method for simultaneously broadcasting a plurality of independent audio signals from at least one transmission point, through the transmission space, to a plurality of reception points and reproducing one of the audio signals selected by a user and providing the audio signal to the user.

2. The Background Art

In many types of both public and private gatherings there is a need to convey audio information from a first point to one or more remote reception points within the area of the gathering. For example, in educational, political, and religious gatherings it is often the case that the participants do not share a common language. Thus, it is often desirable to provide a simultaneous translation for each language spoken and understood by the participants. In such gatherings, for example, if the person addressing the group is speaking in English, it may be necessary to translate the speakers words into Spanish, German, and Russian for the various participants.

In order to ensure the least disruption and the best setting for proceedings where simultaneous translation into several languages must occur, it has been found to be most advantageous to locate the translators in a room which is acoustically isolated from the area where the proceedings are beind conducted and where the translators will be undistracted. In such an arrangement, the speaker's words are conveyed to the translator who can then simultaneously provide a verbal translation of what is being spoken.

Generally, each translator is provided with headphones which convey the words of the speaker who is addressing the proceedings. Each translator, located in her "own" booth or room, is also provided with a microphone into which she verbally provides the simultaneous translation. It will be appreciated that in many instances, several individual translators, for example, ten, twenty, or more, may be necessary.

It is a common practice to provide the translator's verbal translation to one or more headphones which can be worn by the participants. In this way, many different participants can hear the simultaneous translation of the speaker's words in a language which they can readily understand without distracting other participants.

Providing the proper translator's words to the participants in the past required running cables from a central switching area containing what is referred to in the art as a "patch bay." The central switching area has access to all of the translations and also to a headphone at each individual participant's listening station. Once it was known which listening station would require which translation, the patch bay was used to interconnect the translator's audio signal to the appropriate listening station.

When using such systems, users often complained of, or were hindered by, the cable connecting their headphones to the built-in cable system. Furthermore, installing a built-in cable system is an expensive procedure, particularly when retrofitting existing structures. Thus, as will be explained shortly, efforts in the past have been directed to eliminating the need for a cable connection between the participant's headphones and the translator.

Moreover, efforts have also been directed to allowing the user to roam anywhere within the room while still receiving the audio signal from the appropriate translator. Still further, many users often understand more than one language and would like the freedom to switch between several translators. Thus, it has been deemed desirable to allow any participant the option of listening to any one of a plurality of translators without requiring changing the interconnection at the central switching area.

In an effort to provide these advantages, various systems utilizing some type of electromagnetic communciation technique have been adopted. For example, one technique involves using large induction loops which are disposed in the proceedings room. Such induction loops may be implanted in the walls or floors supplying appropriately large amounts of modified current to the induction loops, which causes a modulated electromagnetic field to be radiated into the room. The radiated electromagnetic field (modulated by the translator's audio signal) is received by appropriately tuned coils located on the user's person. The received electromagnetic signals are demodulated and the audio information is passed onto headphones worn by the participant.

Unfortunately, induction loop communication systems have several disadvantages. Such disadvantages include extensive unacceptable cross-talk which occurs with any similar induction loop system in the vicinity, i.e., within the same building. Furthermore, unacceptable amounts of interference due to ambient electrical noise, and the cost of installing and maintaining the equipment, as well as its lack of an easily portable transmitter and difficult set up and take down procedure make such induction loop communications systems an undesirable choice in most situations.

In an effort to overcome some of the difficulties inherent in systems such as induction loop systems, cableless communication systems utilizing radio frequency (RF) techniques have been implemented. Most commonly, such RF-based systems utilize frequency modulation of a carrier in the very high frequency (VHF) band.

Significantly, the RF-based communication systems provided the important advantage of being able to simultaneously transmit more than one audio signal. Thus, in such a system each translator's audio signal might be transmitted on a different carrier frequency using well-known frequency multiplexing techniques and the user carries a battery-operated receiver. The user's receiver can then be turned just as he would a small transistor radio.

Use of RF-based communciation systems inherently have several drawbacks. First, the available space in the desirable portions (usually the VHF band) of the radio frequency spectrum is very limited. The crowding of the radio frequency spectrum is particularly severe in metropolitan areas where such systems are most often used. Communication equipment suitable for use in the present applications and using less crowded portions of the radio frequency spectrum is possible, but at a much greater cost and such equipment still encounters the other disadvantages mentioned below.

Second, as the number of audio channels to be simultaneously transmitted increases, the portion of the spectrum which must be allocated to operation of the communication system must also increase. Thus, the desirable attribute of including many channels in the system competes directly against the requirement of using as little radio spectrum space as possible.

Third, radio frequency signals are susceptible to interference from ambient electromagnetic noise sources such as motors and other electrical devices as well as from interference due to radio transmissions on adjacent frequencies.

Fourth, the use of a RF-based communication system in one room eliminates the possibility of using the same operating frequencies anywhere in the vicinity.

Fifth, a moving receiver located in a building will routinely experience multipath distortion resulting in unsatisfactory operation for the user.

The difficulties inherent in use of the previously available communication systems has prompted the development of systems utilizing optical signals to convey audio information. The availability of low cost and reliable optical devices, such as infrared emitting diodes (IREDs), solid state lasers, and semiconductor photodetectors, has allowed the optical portion of the electromagnetic spectrum to be utilized advantageously in communciation systems of the type described.

It should be understood that as used herein the term "optical signals" or "light" is intended to include any electromagnetic signal or emission above the radio frequency portion of the spectrum and below the X-ray portion of the electromagnetic spectrum. Significantly, the infrared portion of the spectrum is frequently used due to the availability of low cost, reliable electro-optical components.

In one previously available communication system which utilizes an infrared optical signal and has a capability of simultaneously transmitting a plurality of audio signals, the plurality of audio signals are frequency multiplexed to produce a modulating signal. The modulating signal is used to amplitude modulate one or more infrared emitting devices. The modulated infrared optical signal is broadcast into the proceedings room. A portable receiver carried by each user intercepts the optical signal, demodulates the signal, extracts the desired audio signal selected by the user, and conveys the selected audio signal to the user's headphones.

The use of optical signals (such as infrared signals) produces several important advantages over previous systems. One of the advantages which occurs through the use of optical signals is that the operation of identical systems in adjacent rooms is possible with no crosstalk between the systems since the optical signal cannot escape the proceeding room through its opaque walls. Also, due to the very small wavelength of optical signals, multipath distortion is virtually nonexistent. Moreover, the equipment necessary to transmit and receive infrared signals may be made extremely portable. Unfortunately, the use of frequency multiplexing techniques in order to impress a plurality of independent audio signals upon a single optical carrier requires tuned circuits which are complex, bulky, and require adjustment.

In view of the foregoing, it would be a significant advance in the art to provide a wireless communication system which could reliably provide cableless communication of a plurality of channels from a transmission point to a reception point. It would also be an advance in the art to provide a cableless communication system capable of conveying a plurality of channels with a minimum of crosstalk between each channel. It would be a further advance in the art to provide a multi-channel infrared cableless communication system which utilizes low cost components and may be easily transported, set up, and operated. Still another advance in the art would be to provide an infrared cableless communication system wherein much of the signal processing may be carried out by low cost, reliable digital circuitry.

OBJECTS AND BRIEF SUMMARY OF THE INVENTION

In view of the present state of the art, it is a primary object of the present invention to provide a system for cablelessly communicating a plurality of audio channels from a transmitter to one or more receivers located within a transmission space.

It is another object of the present invention to provide a multi-channel cableless communication system which utilizes an optical signal between a transmitter and receiver and which maintains cross-talk between different audio channels at a minimum.

A further object of the present invention is to provide a multi-channel infrared cableless communication system and method wherein many low cost digital electronic components may be used as opposed to analog circuit components.

Yet another object of the present invention is to provide an infrared cableless communication system wherein a large number of audio signals may be simultaneously broadcast.

It is still another object of the present invention is to provide a multi-channel infrared cableless communication system which is portable and requires little or no maintenance.

A still further object of the present invention is to provide a multi-channel infrared cableless communication system wherein a high power infrared optical signal may be transmitted using low cost, easily obtainable optical devices.

Additional objects and advantages will be apparent from the description which follows or they may be learned by the practice of the invention.

Consistent with the foregoing objects, the present invention provides a multi-channel infrared communication system which allows a plurality of audio signals to be broadcast from a transmission point to one or more receivers which may be located anywhere within the optical range of the transmitter, i.e., the transmission space.

The system of the present invention may be broadly divided into three major functional components: an encoder; a transmitter; and, at least one portable receiver.

The present invention includes means for inputting a plurality of independent audio signals into the encoder. The audio signals may be obtained from any one of many different program sources such as microphones, recorded material, and so forth.

Multiplexing means is provided to time-division multiplex the audio signals and to produce a pulse amplitude modulated signal containing the information necessary to reproduce each of the plurality of audio signals. The time-division multiplexing and the production of a pulse amplitude signal is carried out by sequentially sampling in turn each of the audio signals.

In the resulting pulse amplitude modulated signal, each frame contains a plurality of time slots equal to the number of audio signals to be sampled. Each time slot in the pulse amplitude modulated signal contains one pulse. The amplitude of the pulse corresponds to the amplitude of the sampled portion of the audio signal. Thus, the pulse amplitude modulated signal includes a series of pulses, each pulse representing a sample of each audio signal. From the pulse amplitude modulated signal any of the audio signals may be reconstructed.

Conversion means is also provided to convert the pulse amplitude modulated signal to a pulse position modulated signal. After passing through the conversion means, each very brief pulse in the pulse position modulated signal is positioned within each time slot so that the position of the pulse in the time slot directly corresponds to the amplitude of the pulse in the same time slot of the pulse amplitude modulated signal. The pulse position modulated signal comprises a series of pulses having a low duty cycle which are readily transmitted in a serial fashion.

Oscillator means is provided to synchronize the operation of the encoder as well as to insert a sync pulse in the pulse position modulated signal. The pulse position modulated signal and the sync pulse together comprise the encoded composite signal.

The encoded composite signal, which includes the audio information from all of the plurality of audio signals input into the encoder, is conveyed to an optical transmitter. The optical transmitter comprises one or more light emitting devices which may include groups of infrared emitting diodes or similar devices. The switching on and off of the light emitting devices directly corresponds to the pulse train of the encoded composite signal (including the pulse position modulated signal and the sync pulse).

The light-emitting devices of the present invention operate for a relatively small percentage of time as compared to the light-emitting devices of amplitude modulated systems. This low duty cycle allows the light-emitting devices to be operated at or above their "average" current ratings and also allows low cost components to be used. Importantly, since only pulses are reproduced by the optical devices, nonlinearities inherent in the output of such devices are not of concern in the present invention.

The optical signal produced by the light-emitting devices is broadcast into the transmission space containing one or more receivers. Since infrared radiation of the frequency generally preferred for use by the present invention behaves similarly to visible light, reflection of the optical signal within the transmission space allows the entire space to be permeated by the optical signal. Thus, receivers embodying the present invention may be used anywhere within the transmission space and, whether stationary or roaming with the user, communication will still be maintained.

The receiver of the present invention includes means for supplying DC power. The means for supplying DC power preferably may be a battery power supply to allow complete portability of the receiver. Another means is provided in the receiver for receiving the optical signal and converting the pulses of the optical signal into a corresponding electrical pulse train which is referred to as a received composite signal. The received composite signal includes a received pulse position modulated signal equivalent to the encoded pulse position modulated signal. The received composite signal is applied to a selection means for selecting a portion of the pulse position modulated signal.

Each audio signal which is encoded is provided with a specific time slot in the series of time slots found in the received pulse position modulated signal. Thus, as each time slot corresponding to a desired channel is serially received, extraction means is provided to extract the audio signal therefrom and convey the audio signal derived from the selected portion to an amplifier. Included in the extraction means may be a conversion means for converting the received pulse position modulated signal to a received pulse amplitude modulated signal and a low pass filter. After passing the received pulse amplitude modulated signal through the low pass filter to reconstruct the original audio signal, the audio signal is amplified and may be presented to the headphones of the user.

BRIEF DESCRIPTION OF THE DRAWINGS

In order to more fully understand the manner in which the above-recited advantages and objects of the present invention are obtained, a more particular description of the invention will be rendered by reference to a specific embodiment which is illustrated in the accompanying drawings. Understanding that these drawings depict only a typical embodiment of the invention and are therefore not to be considered limiting of its scope, the presently understood best mode and presently preferred embodiment of the invention will be described in detail through the use of the accompanying drawings in which:

FIG. 1A is a perspective view of the receiver portion of the presently preferred embodiment of the present invention being worn by a user.

FIG. 1B is a perspective view of the receiver, transmitter, and encoder portions of the presently preferred embodiment of the present invention.

FIGS. 4A and 4B are wave form diagrams showing the wave forms associated with the functional blocks illustrated in FIG. 3.

DETAILED DESCRIPTION OF THE PREFERRED EMBODIMENT

Figure 2:
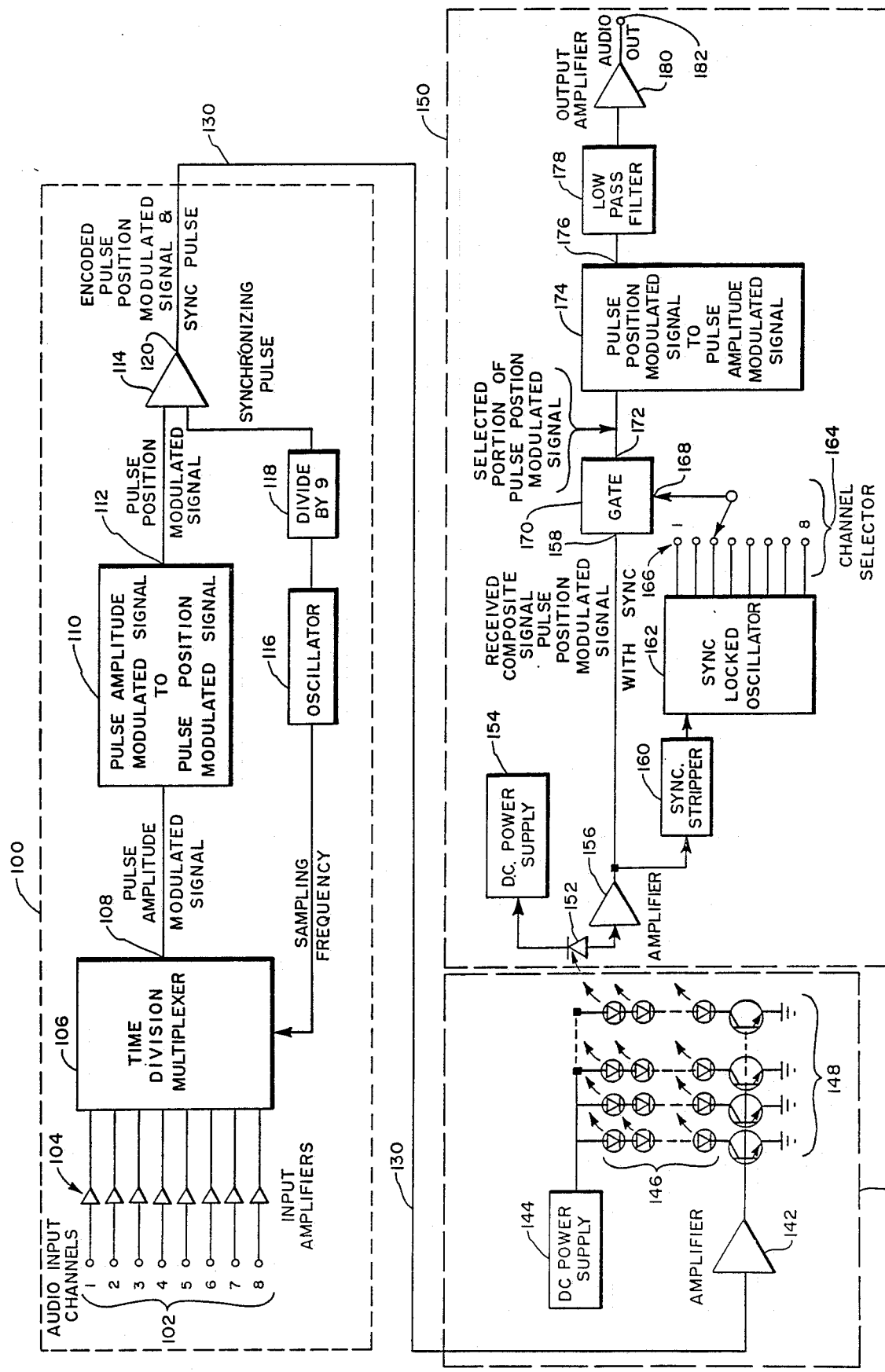
FIG. 2 is a high-level functional block diagram of the encoder, transmitter, and receiver portions of the described embodiment.

Reference will now be made to the drawings wherein like components are provided with like alpha-numeric designations throughout the drawings.

Illustrated in FIGS. 1A and 1B are the components of the presently preferred embodiment of the present invention. Included in FIG. 1A is a receiver, generally designated 10, which is being worn by a user. Included in FIG. 1B is a receiver, generally designated 10, a transmitter generally designated 50, and an encoder 75.

As shown in FIG. 1B, the major components in transmitter 50 include a plurality of vertically arranged groups of infrared emitting diodes, which are represented at 52. Infrared emitting diodes 52, as well as the electrical devices necessary to drive the infrared emitting diodes, are enclosed within housing 56 of transmitter 50. Diffusing screen 54 is installed over the columns of infrared emitting diodes 52 to provide a more esthetically pleasing appearance to transmitter 50 and also to disperse the infrared radiation into the transmission space.

Transmitter 50 receives the encoded composite signal, comprising in combination a pulse position modulated signal and a sync pulse, from encoder 75 by way of coaxial cable 58. As will be explained shortly, the encoded composite signal placed on coaxial cable 58 is a pulse train type signal which may be repeatedly amplified if it is necessary that cable 58 be extended for long runs.

The great advantages of utilizing broadcast infrared optical radiation in order to transmit information from transmitter 50 to one or more receivers 10 is readily appreciated. Such advantages include a lack of multipath distortion and the ability to easily confine the optical signal within a room. Furthermore, the use of several transmitters, such as that illustrated at 50 in FIG. 1B, allows the entire transmission space to be permeated by infrared radiation. Thus, in a small room with light-colored walls and ceiling, a single transmitter such as that illustrated at 50, may be sufficient to provide complete coverage of the room thus allowing the user to move anywhere within the room, and still receive the optical signal from transmitter 50. Alternatively, for example in a large dark-colored room, it may be desirable to include many transmitters, such as ten transmitters as shown in FIG. 1B, in order to provide complete coverage of the transmission space.

The receiver of the presently preferred embodiment is represented at 10 in FIGS. 1A and 1B. As shown in FIG. 1A, receiver 10 is intended to be hung around the neck of a user by way of lanyard 18. Placing receiver 10 in the approximate area of the chest of the user allows the user to easily access channel selection control 14 and volume control 12 as well as presenting photo detector window 16 at an angle where it can most readily receive the infrared optical radiation from transmitter 50. Those skilled in the art will appreciate that the size of the receiver illustrated in FIGS. 1A and 1B may be drastically reduced in future embodiments of the present invention as the number of discrete electronic components is reduced by the inclusion of large scale integrated circuits into receiver 10.

As shown in the partially cut away portion of FIG. 1A, receiver 10 includes batteries 30. Batteries 30, which are necessary in order to allow completely portable operation of receiver 10, may preferably be of a rechargeable type such as nickel cadmium batteries. External contacts 26 are preferably provided to allow in-place charging of batteries 30.

In order to hear the received audio signal, headphones 22 are worn by the user and are connected to the audio output of receiver 10 by way of cord 24. By incorporating headphones 22 into receiver 10, the user may roam anywhere within the transmission space and still hear the audio signal conveying the appropriate translation.

It will be appreciated that there is no limit to the number of receivers 10 which may be placed into service to receive the broadcast infrared optical signal. Moreover, the presently preferred embodiment described herein is adapted for simultaneous transmission of eight audio signals. Importantly, the number of audio signals which are transmitted by the present invention may be greater or less than eight. Generally, in situations where translation of a program into several foreign languages is required, providing eight independent audio channels to simultaneously carry eight translations is often sufficient.

In order to explain the overall principles of operation of the presently preferred embodiment of the present invention FIG. 2 will be referred to next. FIG. 2 is a high-level functional block diagram of the presently preferred embodiment.

The embodiment illustrated in FIG. 2 is divided into three major functional blocks. The dashed box designated 100 contains the encoder 100 (represented at block 75 in FIG. 1) of the presently preferred embodiment. Dashed box 140 contains those components corresponding to the transmitter 140 (represented at 50 in FIG. 1) of the presently preferred embodiment. The encoder portion 100 and the transmitter portion 140 are interconnected by cable 130. In the presently preferred embodiment it is preferred that cable 130 be a coaxial cable. However, twin lead electrical cable as well as optical fibers may be used with other embodiments of the invention as determined by those skilled in the art.

The components contained within dashed box 150 in FIG. 2 represent receiver 150 of the presently preferred embodiment. Importantly, there is no cable connection between transmitter 140 and receiver 150. Rather, an optical signal broadcast by transmitter 140 conveys information to receiver 150. Thus, a user carrying receiver 150 may roam anywhere within the transmission space and still receive the optical signal and hear the appropriate audio signal. It should be appreciated that in the functional block diagrams included herein, the provision for supplying DC power to many of the components are not explicitly shown but may be readily devised by one having skill in the art.

The illustrated embodiment is adapted for simultaneous transmission of eight audio signals. The eight audio signals are represented by the eight audio input channels designated at bracket 102 in FIG. 2. It will be realized that the eight audio input channels 102 may receive program material from a live microphone or from recorded material. The audio signals input to the eight audio channels are processed and amplified as represented by input amplifiers generally designated 104 in FIG. 2.

As shown in FIG. 2, the presently preferred embodiment includes time-division multiplexer 106. Output 108 of time-division multiplixer 106 presents a pulse amplitude modulated signal containing the information necessary to accurately reproduce the audio signals contained on all eight of audio channels 102. The format of the pulse amplitude modulated signal will be explained in detail in connection with FIGS. 3–6.

Time-division multiplexer 106 is driven by oscillator 116 which produces a sampling frequency which is input to time-division multiplexer 106. According to the Nyquist criteria, the sampling frequency must be at least twice as great as the highest frequency to be sampled in the input audio signal. Thus, since eight audio signals are to be sampled, the sampling frequency must be at least 16 times greater than the highest audio frequency to be reproduced and then still allow a sync pulse to be inserted as will be explained shortly.

The pulse amplitude modulated signal is input to converter 110. Converter 110 is a pulse amplitude modulated signal to pulse position modulated signal converter. The conversion of the pulse amplitude modulated signal to a pulse position modulated signal provides several important advantages over that which is available in the prior art.

Among these advantages is the fact that for communication by way of a high speed optical link using a pulse position modulated signal, the signal to noise ratio is much higher than that obtainable when using a pulse amplitude modulated signal and the same transmitter components. This is due to the fact that the information used to reconstruct the amplitude of the encoded audio signal is stored in the position of the pulse (i.e., the timing of the pulse) rather than in the amplitude of the pulse itself. Thus, the duty cycle of the pulse position modulated signal is relatively low which allows low current components to be reliably used. Moreover, much of the signal processing may be carried out using inexpensive digital integrated circuits.

Output 112 of converter 110 presents the pulse position modulated signal to amplifier 114. Amplifier 114 mixes the pulse position modulated signal with a sync pulse. The sync pulse is obtained by passing the sampling fequency generated by oscillator 116 through a "divide by nine" circuit 118. The sync pulse is conveyed to one input of amplifier 114.

Output 120 of amplifier 114 thus passes a signal referred to as an encoded composite signal which includes the encoded pulse position modulated signal and a sync pulse. It should be appreciated that schemes other than utilization of a single sync pulse for each frame may be devised by those skilled in the art. Thus, the inclusion of a single sync pulse to accompany the pulse position modulated signal on cable 130 may not be critical in all embodiments incorporating the present invention.

As illustrated in FIG. 2, transmitter 140 of the embodiment receives the encoded composite signal from encoder 100 by way of cable 130. The encoded composite signal is first amplified by amplifier 142 and then applied to the bases of switching transistors 148. As will be noted at backet 146, a plurality of light emitting diodes are provided.

Light emitting diodes 146 are preferably infrared emitting diodes. As can be seen in FIG. 2, infrared emitting diodes 146 are arranged in serially connected groups, each group being connected in parallel between the output of DC power supply 144 and one of switching transistors 148.

It will be appreciated that with the configuration shown in block 140 of FIG. 2, infrared emitting diodes 146 will be activated each time a pulse is present on cable 130 and will turn off when a pulse is not present. Thus, the timing of the pulses emitted by the purality of infrared emitting diodes 146 will be identical to the timing of the encoded composite signal including the encoded pulse position modulated signal. Furthermore, it will be appreciated that just as a plurality of other similar devices may be used, a single optical device may be used in place of the purality of diodes 146 as shown in FIG. 2.

The inclusion of a plurality of diodes 146 has an important advantage. Significantly, by serially connecting groups of infrared light-emitting diodes, and then connecting the groups in parallel, the output of the optical signal may be increased at a lower cost. In contrast, using fewer infrared emitting diodes, but each diode having a higher individual power rating, would cost much more. Furthermore, the inherent reliability in the incorporation of a plurality of infrared emitting diodes, rather than a single or a few components, is desirable.

As shown in block 150 of FIG. 2, the receiver of the embodiment is provided with a DC power supply. Preferably, DC power supply 154 is a battery-operated power supply to allow complete portability of the receiver. Other power supply schemes, however, may be incorporated into the present invention.

Incorporated within the receiver is at least one photo detection device 152 which is preferably a photo diode. Photo diode 152 converts the infrared optical signal broadcast by the infrared emitting diodes 146 into an electrical current. It should be understood that devices other than those described herein may perform the function of photo diode 152.

As is known in the art, when infrared radiation of the appropriate strength and frequency strikes photo diode 152, a current will pass through the photo diode. Advantageously, since a pulse position modulation scheme is used, the amplitude of the output of the photo diode 152 is not critical and ordinary nonlinearities found in the operation of photo diode 152 are not of great concern. Furthermore, depending upon the sampling frequency used in the encoder (which will determine the maximum period between, and the width of, the individual pulses in the pulse position modulated signal), a photo diode may be selected which has appropriately fast turn-on and turn-off times.

Thus, it will be appreciated that the electrical signal output from photo diode 152 is a replica of the encoded composite signal (including the pulse position modulated signal). The received composite signal output from photo diode 152 is amplified by amplifier 156. Thus, since ideally the signal output from photo diode 152, and processed by the other components of receiver 150, is identical to the previously encoded and broadcast composite signal, the signal output from photo diode 152 and amplifier 156 will be referred to as a "received composite signal" to distinguish it from the encoded composite signal which was impressed upon the optical signal.

The received composite signal, complete with the received pulse position modulated signal and sync pulse, is output from amplifier 156 and applied to input 158 of gate 170.

The received composite signal, which is output from amplifier 156, contains the information necessary to reproduce all eight audio channels as well as the sync pulse. Thus, it is necessary to include circuitry to extract the desired audio information from the received pulse position modulated signal.

In order to accomplish the extraction of the desired audio information, the received composite signal is directed to sync stripper circuit 160. Sync stripper circuit 160 rejects all portions of the received composite signal except the sync pulse. The remaining sync pulse is applied to sync locked oscillator 162 as indicated in FIG. 2.

Sync locked oscillator 162 provides eight timing pulses which have a period equal to the period of the sampling frequency. The timing pulses appear at sync locked oscillator outputs generally designated at 166. A switching device indicated at bracket 164 and labeled "channel selector," is manually adjusted by the user so that the appropriate timing pulse is input to input 168 of gate 170.

As shown in FIG. 2, channel selector 164 is set to receive the timing pulse present on the third output of sync locked oscillator 166 and apply that output to gate input 168. Thus, as the appropriate portion of the pulse position modulated signal arrives at gate 170, gate 170 acts to allow the information corresponding to the desired audio channel to pass through gate 170.

Thus, at the output 172 of gate 170 a selected portion of the received pulse position modulated signal (corresponding to only a single audio channel) is present and is input to converter 174. Converter 174 is a pulse position modulated signal to pulse amplitude modulated signal converter. It should be appreciated that embodiments of the present invention may be devised which operate without converter 174 and that the audio information for the desired audio channel may be extracted directly from the received pulse position modulated signal. However, a higher fidelity audio signal may be recovered by first converting the selected pulse position modulated signal to a pulse amplitude modulated signal, as is carried out by the converter represented at 174.

The output of converter 176 is processed by low pass filter 178. The output of low pass filter 178 is a reconstruction of the audio input signal present at the corresponding audio input channel in the encoder of the embodiment.

With the reconstructed audio signal appearing at the output of low pass filter 178, it is only necessary to amplify the audio signal by way of output amplifier 180 and then present the amplified audio signal to the user by way of audio output 182. It is generally expected that the audio output will be conveyed to headphones worn by the user.

Figure 3:
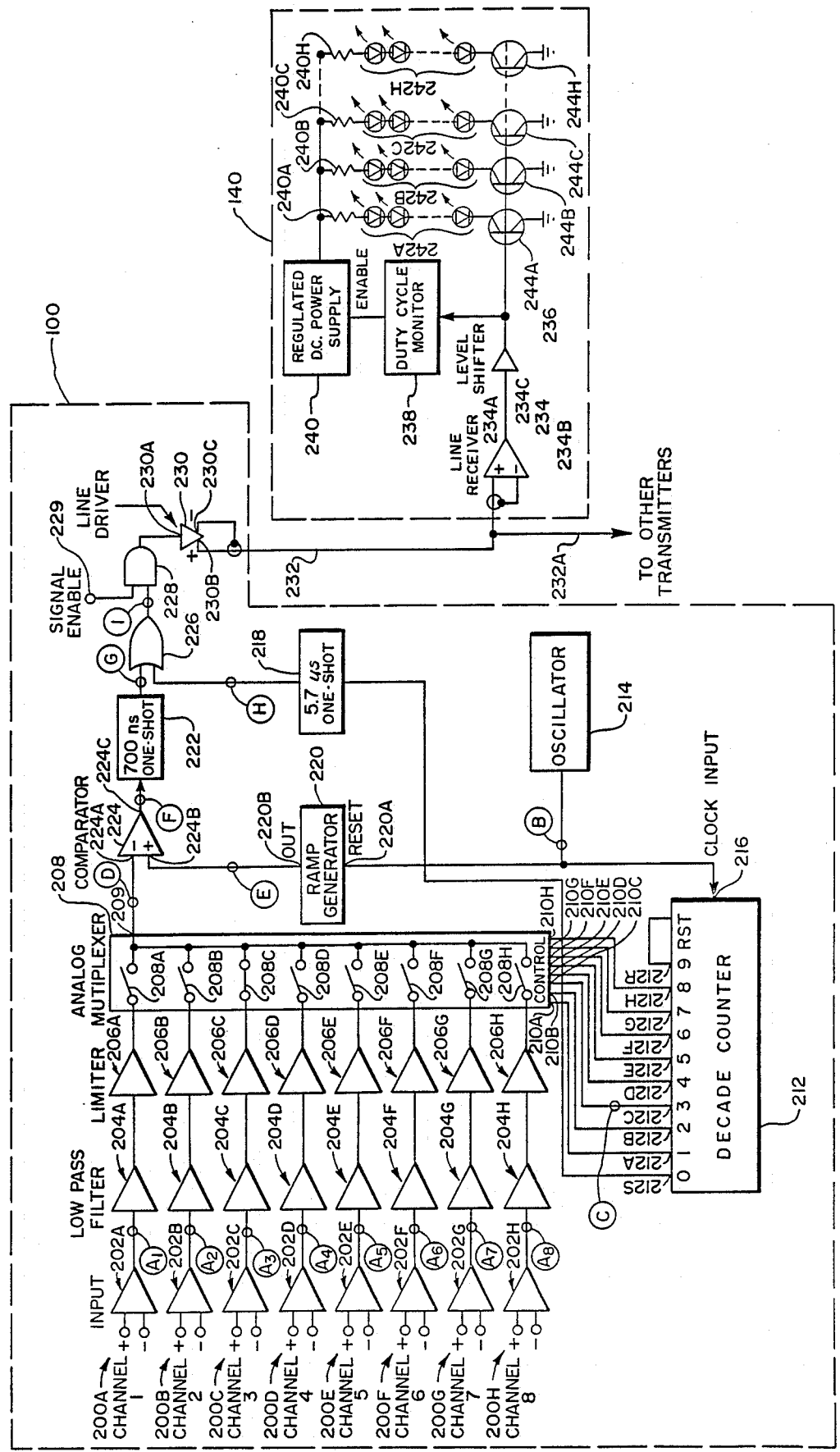
FIG. 3 is a detailed functional block diagram of the encoder and transmitter portions of the presently preferred embodiment of the present invention.

Having explained the operation of the presently preferred embodiment of the present invention using the high-level block diagram illustrated in FIG. 2, FIG. 3 will now be used to explain in greater detail the functional blocks incorporated into the presently preferred embodiment. Additionally, the wave form diagrams provided in FIGS. 4A, 4B, and FIG. 6 will be used in connection with FIGS. 3 and 5 in order to explain in greater detail the specific operation of the presently preferred embodiment. Also, the circled letter designations shown in FIGS. 3 and 5 reference the similarly designated wave forms in FIGS. 4A, 4B, and 6.

Figure 5:
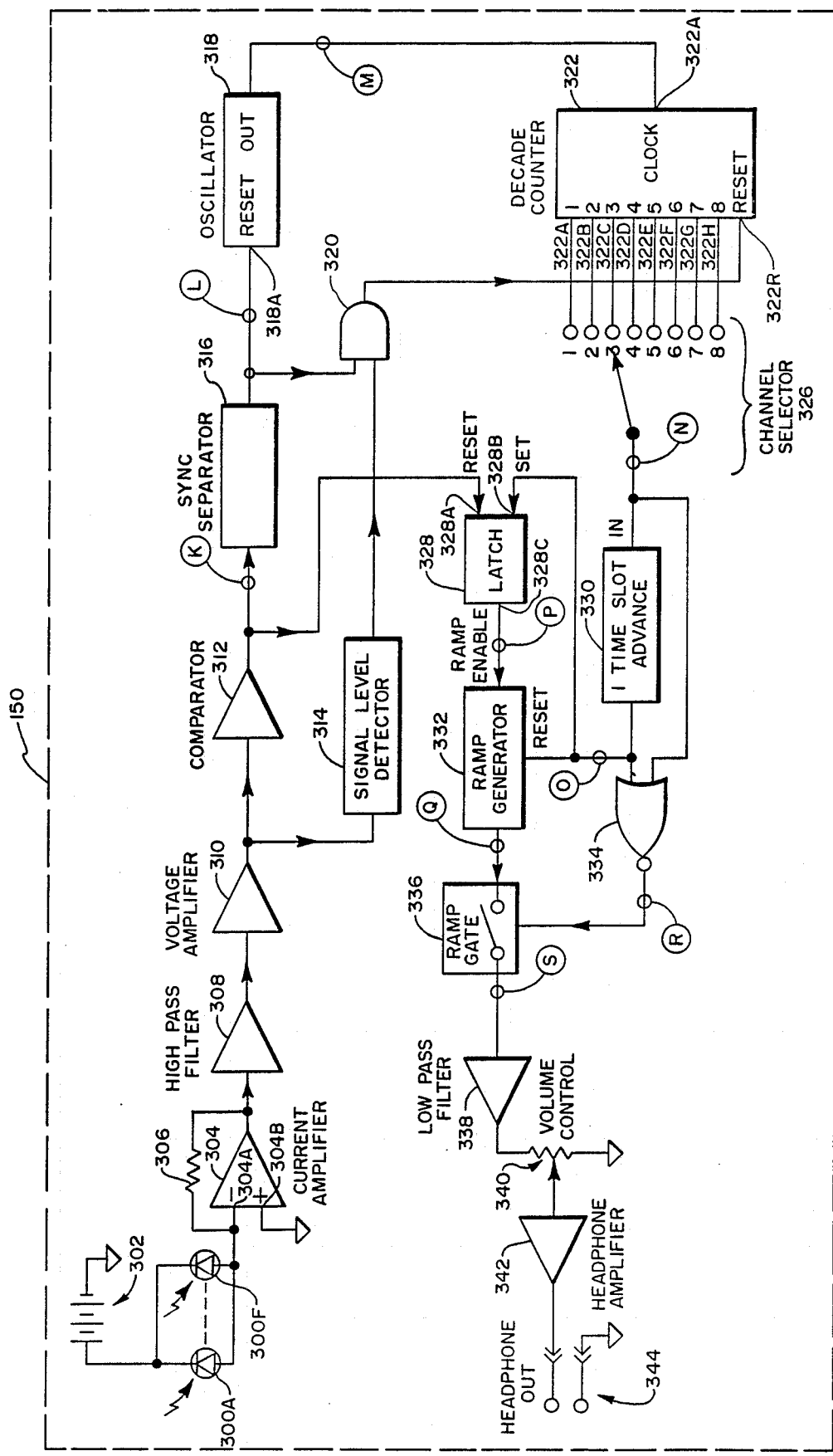
FIG. 5 is a detailed functional block diagram of the receiver portion of the presently preferred embodiment of the present invention.

It should be noted that the components included within dashed boxes 100, 140, and 150 in FIGS. 3 and 5 correspond to the encoder, transmitter, and receiver portions of the presently preferred embodiment as described earlier in connection with FIG. 2. It should also be appreciated that the inclusion of the more detailed functional block diagram as shown in FIGS. 3 and 5 is not intended to limit the scope of the present invention but merely better describe the presently preferred embodiment of the present invention.

In FIG. 3, audio channels 1-8 (200A-200H, respectively) are represented. As mentioned previously, while the presently preferred embodiment is adapted for simultaneous transmission of eight independent audio channels, those skilled in the art using the information disclosed herein will readily be able to devise embodiments of the present invention adapted for use with less than eight audio channels or more than eight audio channels.

As represented in FIG. 3, in the illustrated embodiment an audio input amplifier (202A-202H) is provided for each audio channel 200A-200H. Preferably, inputs 202A-202H are adapted for connection to a balanced, lowimpedance, line level (−4 dBu) audio signal source. For example, a microphone preamplifier output may be applied to input amplifiers 202A-202H.

Portions of the audio signals contained in channels 1-8 are represented by wave forms represented in FIG. 4A. Each of the eight audio signals input to the eight channels is represented in FIG. 4A and is labeled with the appropriate channel.

Each of the wave forms shown in FIG. 4A includes just a small portion (82.97 microseconds) of the complete wave forms. The sampling frequency of the embodiment illustrated in FIGS. 3 and 5 is 108.45 KHz. When the sampling frequency is divided by nine time slots (eight audio channels and the insertion of a sync pulse) the effective sampling rate of each channel is 12.05 KHz.

According to the Nyquist criteria, the audio frequency to be sampled must be limited to one half the effective sampling frequency. Thus, each channel is provided with a sampling frequency. Thus, each channel is provided with a low pass filter in the presently preferred embodiment. Preferably, low pass filters 204A-204H are each 5.5 KHz sixth order low pass filters.

Next in the signal processing chain of each of the channels are limiter circuits 206A-206H. Limiter circuits 206A-206H preferably limit the dynamic range of the audio signals to +6 dBu (4.4 volts peak to peak) so that the levels of the encoded pulse amplitude modulated signals which result from sampling all eight of the audio channels will stay within limits of 3.5 volts, to 8.5 volts as will be explained shortly.

After the audio signal of each channel has been amplified, filtered, and limited, it is applied to analog multiplexer 208. As shown in FIG. 3, analog multiplexer 208 may be represented as consisting of eight analog switches (208A-208H) which when closed (as shown at 208C for channel 3) pass the audio signal for its corresponding channel to analog multiplexer output 209.

The closing of switches 208A-208H is controlled by the assertion of a signal on analog multiplexer control inputs 210A-210H as shown in FIG. 3. The analog multiplexer control inputs (210A-210H) are driven by decade counter 212.

Decade counter 212 sequentially asserts its ten outputs 0-9 (212S, 212A-212H, and 212R) with outputs 0-8 being asserted for one period of a clock pulse which is input at decade counter clock input 216. Thus, as clock pulses are input at 216, decade counter outputs 0-9 (212S, 212A-212H, and 212R) will be serially asserted.

As can be understood by an examination of FIG. 3, when the decade counter output 0 (212S) is asserted a sync pulse will be generated. Likewise, when decade counter outputs 1-8 (212A-212H) are sequentially asserted, the audio signals present on channels 1-8 will, in their turn, be conveyed to audio multiplexer output 209. Furthermore, when decade counter output 9 (212R) is asserted, the decade counter reset input will be triggered, causing the sequence to begin again.

The sequence just described causes a pulse amplitude modulated signal to appear at the output of analog multiplexer 209 as will be explained more fully next in connection with the wave forms shown in FIG. 4A.

In FIG. 4A, portions of eight different audio wave forms are represented. In order to show all of the wave forms in greater clarity, the diagram has been greatly expanded in the horizontal direction when compared to the amplitude of the wave forms. Thus, the wave forms (A1–A8) shown for each channel appear as slightly curved or horizontal lines.

It can be seen in FIG. 4A that wave forms representing the eight audio signals are included which correspond to the audio signals found on the inputs to channels 1–8. As represented in FIG. 4A and AA, the periodic sampling of each of the audio signals produces a series of pulses whose amplitude varies according to the amplitude of the particular audio signal which was sampled in the respective time slot. Due to the relatively short sampling period (9.22 microseconds), the portion of the audio signal which actually passes through analog multiplexer 208 can be considered to be a pulse, (i.e., having a constant amplitude during the sampling period).

Figure 4B:
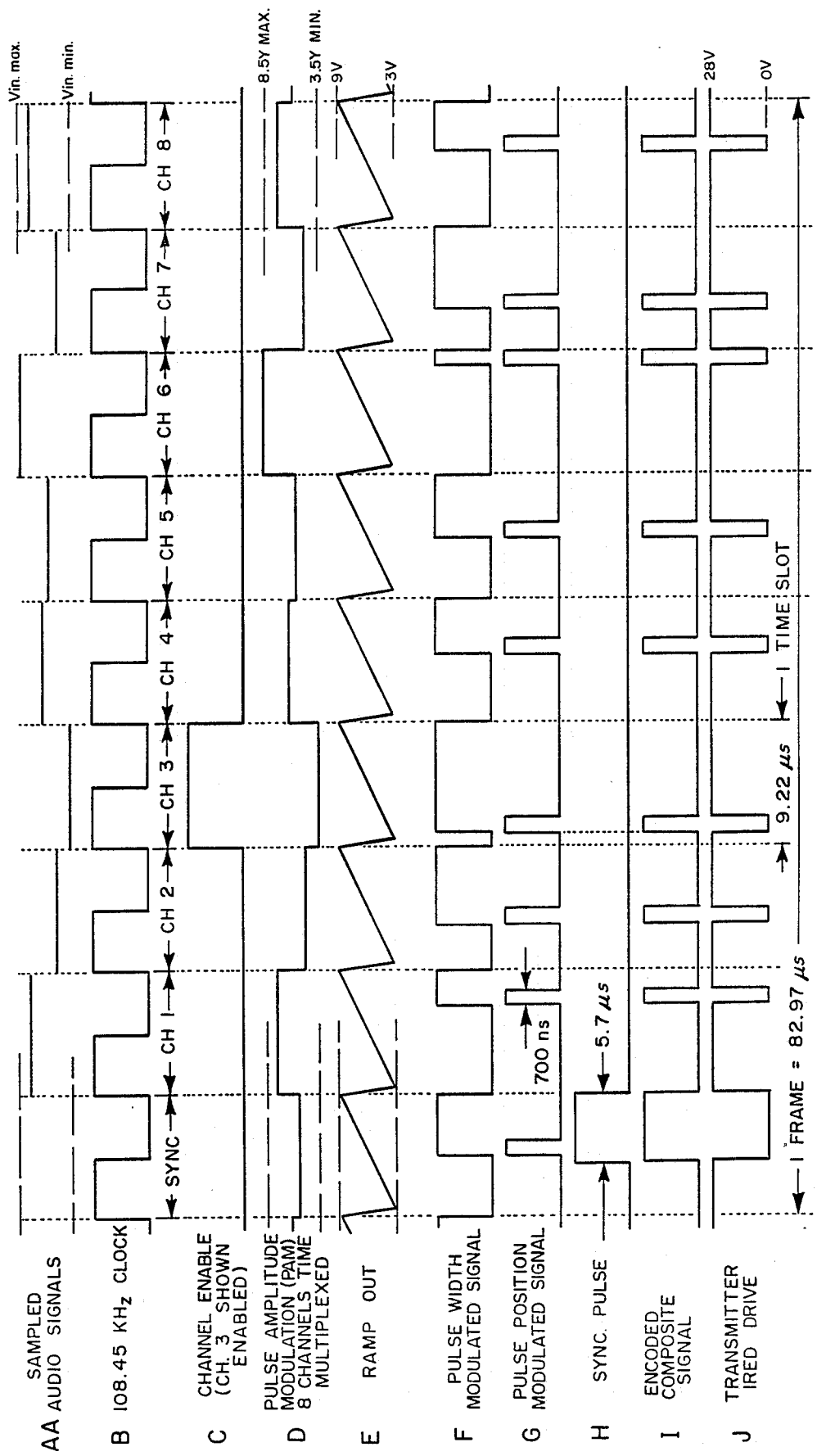

Referring now to FIG. 4B, wave form AA in FIG. 4A is reproduced at AA in FIG. 4B. In FIG. 4B, a 108.45 KHz (hereinafter 108 KHz) clock signal is represented at wave form B. The 108 KHz clock signal is input to decade counter 212 as well as ramp generator 220.

The 108 KHz clock signal is generated by oscillator 214. Oscillator 214 is a 3.58 MHz crystal controlled oscillator whose output is divided by 33. Thus, as represented in FIG. 4B, the sampling period of each channel, also referred to as one time slot, is 9.22 microseconds. Thus, since eight channels must be sampled, as well as accommodating the insertion of a sync pulse, one frame of the described embodiment is 82.97 microseconds long (9.22 microseconds×9 time slots=82.97 microseconds=one frame). As represented in FIG. 4B at wave form C and in FIG. 3 at decade counter output 212C, when a decade counter output is asserted, the corresponding internal switch of the analog multiplexer (208C) closes allowing the corresponding channel's audio signal to appear at output 209.

In view of the foregoing discussion, it will be appreciated that a pulse amplitude modulated signal appears at the output 209 of analog multiplexer 208. As shown at wave form D in FIG. 4B, the encoded pulse amplitude modulated (PAM) signal includes time multiplexed amplitude information from each of the eight channels. Furthermore, as shown in FIG. 4B, due to the limiting of each audio signal by limiter circuit 206A–206H, the pulse amplitude modulation signal varies between a minimum of 3.5 volts and a maximum of 8.5 volts.

It should be noted that at this point an encoded pulse amplitude modulated signal has been generated which includes time-division multiplexed sampled information from each of the eight audio channels. Having generated a pulse amplitude modulated signal containing the information from each of the eight audio channels, it is necessary to convert the encoded pulse amplitude modulated signal to an encoded pulse position modulated signal. In order to do so, the encoded pulse amplitude modulated signal (D in FIG. 4B) is applied to the inverting input 224A of comparator 224. Also, a ramp wave form is applied to noninverting input 224B of comparator 224.

Ramp generator 220 is a free running ramp generator which produces a linearly increasing ramp voltage that varies between a minimum of three volts and a maximum of nine volts, which is presented at its output 220B. Ramp generator 220 is reset each clock cycle (i.e., at the beginning of each time slot) by inputting the 108 KHz clock signal to its reset input 220A as shown in FIG. 3.

In operation, as the pulse amplitude modulated signal (D in FIG. 4B) is applied to inverting input 224A and the ramp wave form (E in FIG. 4B) is applied to noninverting input 224B, an encoded pulse width modulation signal is output at comparator output 224C having a wave form such as that illustrated at F in FIG. 4B. It will be appreciated that since the amplitude of the pulse amplitude modulated signal in each time slot is substantially constant, and the ramp wave form increases linearly, the width of the pulse output from comparator 224 varies proportionally with the amplitude of the encoded pulse amplitude modulated signal.

In the embodiment illustrated in FIG. 3 and as represented at wave form F of FIG. 4B, if the pulse amplitude modulated signal has a low amplitude in a particular time slot, such as represented in the time slot for channel 3, comparator output 224 will switch relatively quickly. Conversely, if the pulse amplitude signal has a high value, such as represented in the time slot for channel 6, the output 224C of the comparator will switch relatively late in the period of the ramp wave form as shown in FIG. 4B.

Having generated a pulse width modulation signal it is necessary to convert the pulse width modulation signal to a position modulated signal to complete the conversion from pulse amplitude modulation to pulse position modulation. This is accomplished by presenting the pulse width modulation signal to a 700 nanosecond one-shot circuit, represented at 222 in FIG. 3. As can be seen at wave form G in FIG. 4B, the 700 nanosecond one-shot circuit outputs a single 700 nanosecond pulse on the leading edge of each positive-going transition of the pulse width modulation signal (wave form F). Wave form G in FIG. 4B represents the encoded pulse position modulated signal.

Having completed the conversion of the pulse amplitude modulation signal to a corresponding pulse position modulated signal, a sync pulse having a width of 5.7 microseconds is added to form an encoded composite signal as represented by wave forms H and I in FIG. 4B.

The sync pulse is generated by the 5.7 microsecond one-shot circuit 218 which is triggered by the 0 output (212S) of decade counter 212. The functioning of the sync pulse will become more apparent in connection with the description of the receiver portion of the presently preferred embodiment.

The pulse position modulated signal and the sync pulse are applied to separate inputs of OR gate 226. Thus, if either a pulse is present in the encoded pulse position modulated signal, or if the sync pulse is present, OR gate 226 outputs a pulse to form an encoded composite signal.

Signal enable input 229 is preferably provided and applied to one input of AND gate 228. Provision of signal enable input 229 as shown, allows blockage of the pulse position modulated signal to the transmitter portion 140 of the embodiment as desired. With signal enable input 229 asserted, the encoded composite signal appears at the output of AND gate 228 and is applied to differential line driver 230.

It is preferred that coaxial cable 232 be used to connect encoder 100 with each transmitter 140. The center conductor of coaxial cable 232 is preferably connected to high output 230B of differential line driver 230 while the shield of coaxial cable 232 is preferably connected to the low output 230C of the differential line driver as represented in FIG. 3.

Advantageously, a large number of transmitters 140 may be directly connected to coaxial cable 232. It is preferable, however, that each differential line driver 230 drive only ten or fewer transmitter. Those skilled in the art will readily be able to devise the circuitry necessary to allow incorporation of as many transmitters as may be required to adequately cover a room, rooms, or other transmission space.

As shown in FIG. 3, transmitter 140 of the illustrated embodiment includes line receiver 234 having the center conductor of coaxial cable 232 connected to input 234A and the shield of coaxial cable 232 connected to input 234B. Output 234C of line receiver 234 is applied to level shifter 236. Level shifter 236 provides a high current encoded composite signal sufficient to drive switching transistors 244A-244H.

Also included in transmitter 140 is a regulated DC power supply 240. Preferably, regulated DC power supply 240 provides 24 volts DC which is applied to groups of serially connected infrared emitting diodes indicated at brackets 242A-242H. Each column of infrared emitting diodes is provided with a current limiting resistor 240A-240H. Preferably, each column of infrared emitting diodes contains twelve discrete infrared emitting diodes. The illustrated embodiment is provided with eight columns of infrared red emitting diodes, for a total of 96 infrared emitting diodes.

As illustrated in FIG. 3, the encoded composite signal is applied to the bases of switching transistors 244A-244H. Thus, all of the switching transistors will simultaneously turn on causing current to flow through all columns of the infrared emitting diodes. In this way, the optical signal produced by the infrared emitting diodes will directly correspond to the encoded composite signal (which contains the encoded pulse position modulated signal).

As noted in FIG. 4B at wave form J, the voltage present at the collector of each of the switching transistors is the inverse of the composite output signal, i.e., the voltage at the collector of the switching transistors ideally drops to zero when the switching transistors are switched on.

It will be appreciated that obtaining the greatest possible output from infrared emitting diodes is desirable. The cost of high power infrared emitting diodes, however, precludes their use in many circumstances where the embodiments of the present invention have application. Thus, a plurality of relatively low power infrared emitted diodes is used. Furthermore, the use of pulse position modulation (utilizing only one 5.7 microsecond sync pulse and eight 700 nanosecond pulses in each 82.97 microsecond frame) allows a current pulse to be passed through the infrared emitting diodes which is much greater than their average current ratings without incurring any short or long term damage to the infrared emitting diodes. The less than 15% duty cycle imposed upon the infrared emitting diodes allows significant current pulses to be passed therethrough and their optical output maximized without the need for resorting to high power devices with their increased cost and other difficulties.

In order to ensure against accidental destruction of the infrared emitting diodes due to a component failure or other cause, a duty cycle monitor 238 is included in transmitter 140 to disabled regulated DC power supply 240 as indicated in FIG. 3 if the duty cycle imposed upon the infrared emitting diodes exceeds a safe predetermined threshold. Also, preferably the infrared emitting diodes are mounted on a heat sink material which allows generated heat to be harmlessly dissipated.

It will be appreciated that the infrared emitting diodes which are selected must be able to accurately pass the encoded composite signal including the pulses of the pulse position modulated signal. Thus, while the presently preferred embodiment is well adapted for transmission of speech (having an upper frequency limit of about 3 KHz), if a higher audio frequency limit is to be utilized (requiring a higher sampling frequency) it may be desirable to include infrared emitting diodes having shorter turn-on and turn-off times with the understanding that such would likely result in the use of higher cost infrared emitting diodes.

Additionally, if additional channels were to be included in the embodiment, the above-mentioned factors would also need to be considered with the resulting increase in sampling frequency. Generally, the turn-on and turn-off speed of the infrared emitting diodes is the limiting criteria of the embodiment with the remaining embodiment components being able to readily matched or exceed the speed of the infrared emitting diodes.

When installing the described embodiment, sufficient numbers of transmitters should be included within an area to completely permeate the transmission space with the optical signal. Infrared radiation of the frequency generally emitted by the preferred infrared emitting diodes has approximately the same reflective characteristics as radiation in the visible portion of the spectrum. Thus, it is not absolutely necessary that a receiver have a line of sight access to a transmitter since the optical signal can bounce off walls, ceilings, furnishings, and even humans to provide a usable signal.

Advantageously, since the audio information to be recovered from the pulse position modulated signal is time dependent rather than amplitude dependent (i.e., dependent upon the position of the pulses rather than the amplitude of the pulses), the signal to noise ratio of the audio output remains constant even as the optical signal is attenuated. Still, if the optical signal is attenuated below a certain threshold, the receiver will not be able to recover the needed information. However, if the optical signal if severely attenuated, the pulses tend to become "rounded" which may cause some error in the recovery of the audio information. Also, since the wavelength of the infrared optical signal is generally in the range from 800 to 900 nanometers, multipath distortion is virtually eliminated.

Thus, the present invention provides great advantages over both previously available radio frequency based systems as well as other optical signal systems utilizing either amplitude modulation or frequency modulation.

Figure 21:
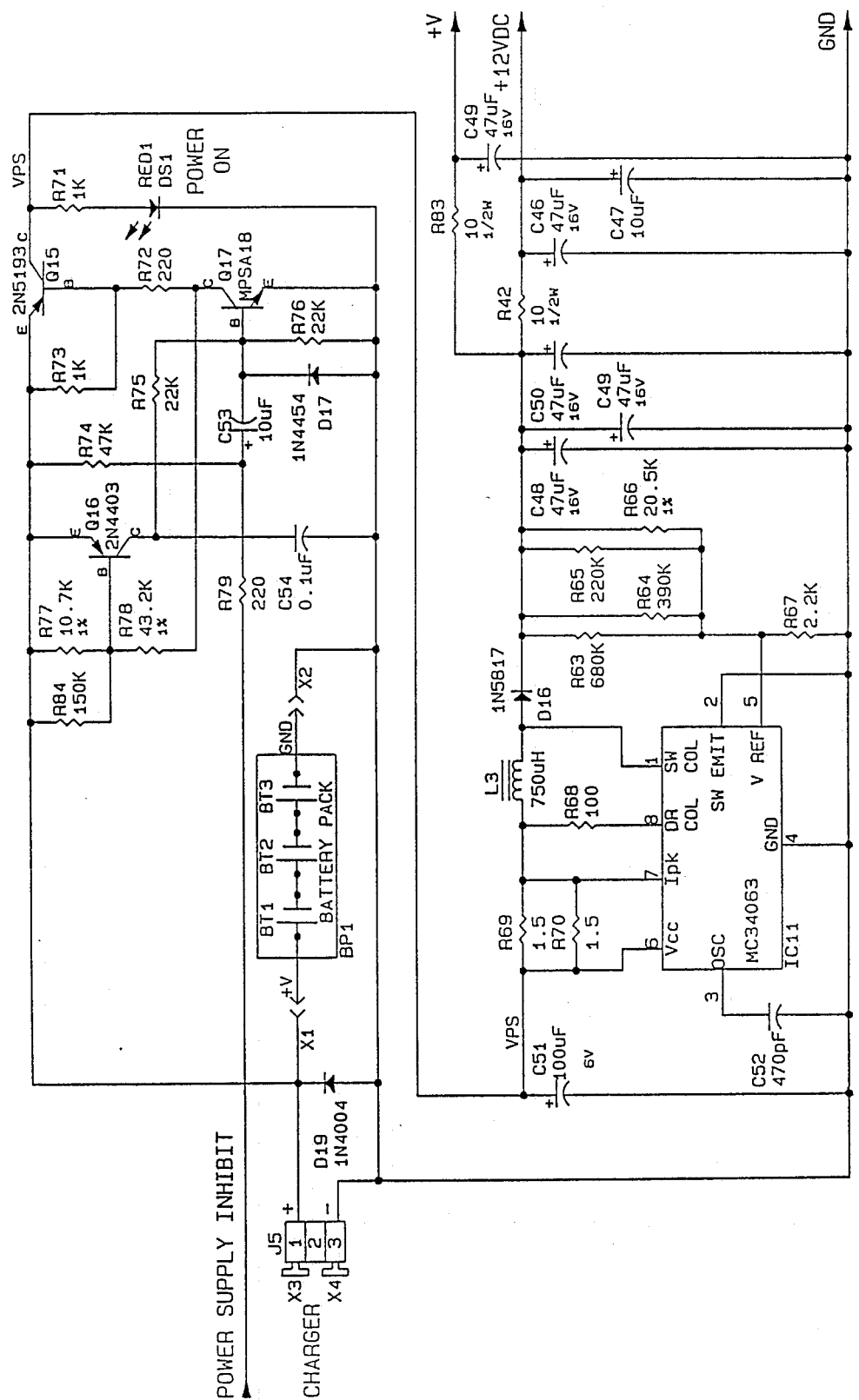

Also illustrated in FIG. 5 is the receiver 150 of the presently preferred embodiment. A battery power source represented at 302 is provded to allow completely portable operation of receiver 150. It should be noted that many components which may be included in the receiver require 12 volts DC for operation. Thus it may be necessary to include a DC to DC converter circuit which is not represented in FIG. 5 but which is represented in the detailed schematic diagram of FIG. 21.

For each of reference, the signals which are received by, and generated within, the receiver portion of the presently preferred embodiment illustrated in FIG. 5 will be referred to as "received" signals, e.g., received optical signal, received composite signal, received pulse position modulated signal, and received pulse amplitude modulated signal.

As indicated in FIG. 5, six photodiodes, represented at 300A-300F are connected in parallel. Photodiodes 300A-300F are positioned on the receiver as illustrated at 16 in FIG. 1B. It will be appreciated that the photodiodes should be positioned in a location which will allow them to be struck by the infrared optical signal. Thus, it is desirable to include more than one infrared photodiode in order to increase the surface area which the infrared optical signal can strike as well as to increase the current output from the photodiodes.

Preferably, the spectral response of photodiodes 300A-300F is closely matched to the spectral transmission of the infrared emitting diodes incorporated into the transmitter. The frequency of the infrared emitting diodes and the infrared photodiodes should be chosen so as to obtain the best compromise between costs of the components, the power output available, the sensitivity of the photodiode, and the avoidance of the frequency of ambient infrared radiation, such as from incandescent lighting. It will be noted that a greater or lesser number of infrared photodiodes may be incorporated into embodiments of the present invention with consideration for the above mentioned factors.

The current through photodiodes 300A-300F is presented to inverting input 304A of current amplifier 304. With noninverting input 304B of the current amplifier grounded, and by selecting the proper value for feedback resistor 306, current amplifier 304 is configured as a high gain inverting amplifier. Preferably, current amplifier 304 provides an amplification factor of 5000:1.

The received composite signal which is output from current amplifer 304 is passed through high pass filter 308. High pass filter 308 preferably has a cutoff frequency of 10 KHz. Thus, high pass filter 308 serves to pass the high frequency of the received composite signal, but greatly reduces the 50 Hz or 60 Hz frequency components which may be received by the photodiode from high intensity incandescent lights or any infrared radiation generated by fluorescent lights which may have a spectral range of up 2 KHz.

The output of high pass filter 308 is passed along to voltage amplifier 310. Preferably, voltage amplifier 310 is a 75 dB voltage amplifier implemented with discrete high speed, low noise transistors. Also, it is preferred that circuitry be included in voltage amplifier 310 to prevent saturation during amplification of a high level received composite signal. Voltage amplifier 310 should have a frequency response of at least about 2 MHz in order to faithfully amplify the received composite signal.

In many circumstances, the composite signal will include significant amounts of noise. Thus, the received composite signal is passed onto comparator 312. The output of comparator 312, provided an optical signal of at least a minimum strength is received, will be the same as the received composite signal with the noise removed. While the noise removing function of comparator 312 may not always be necessary, it is preferred that comparator 312 always be included to provide sharply defined pulses as well as to remove noise.

Figure 6:
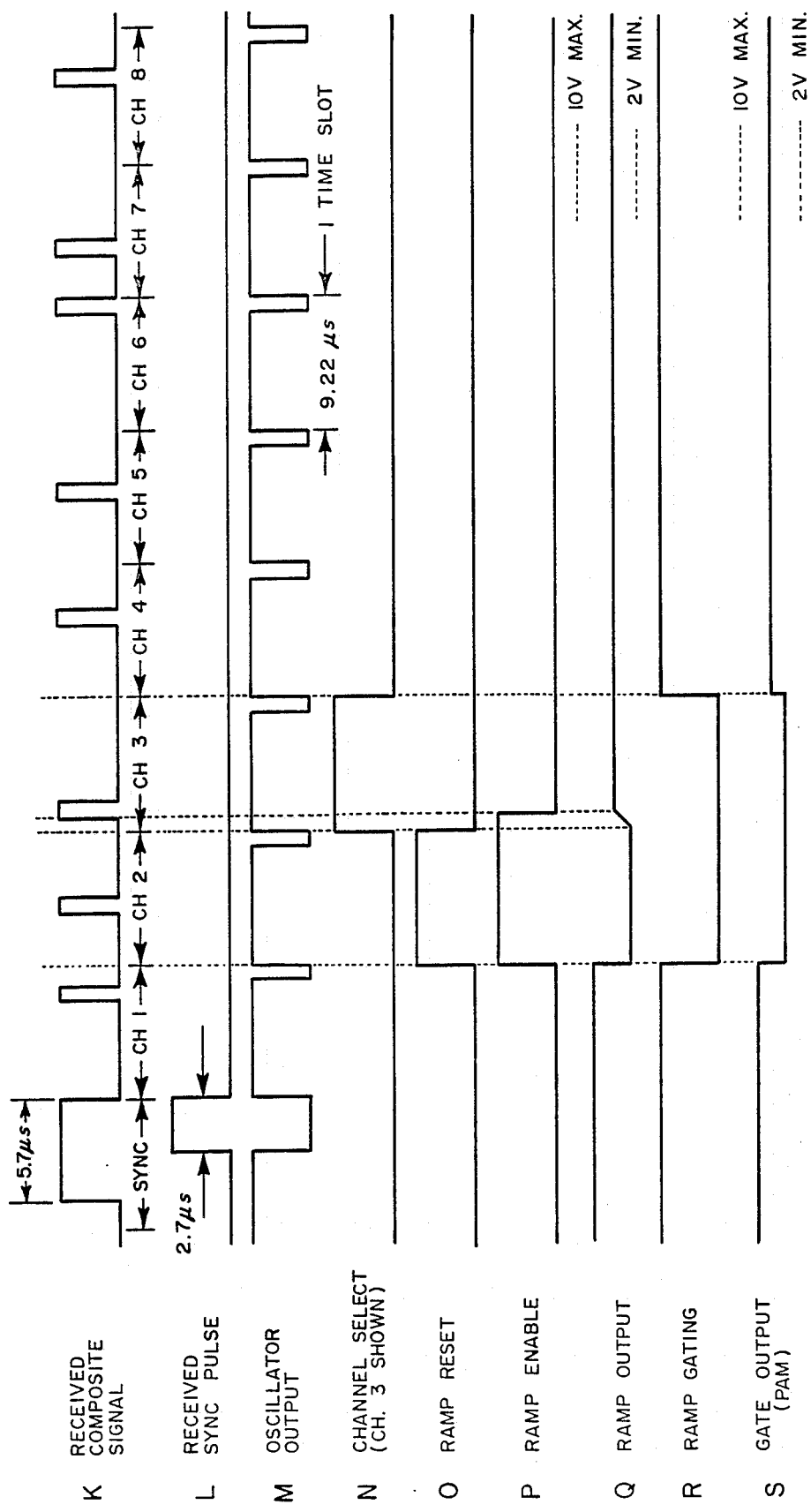
FIG. 6 is a wave form diagram showing the wave forms associated with the functional blocks illustrated in FIG. 5.
Figure 7:
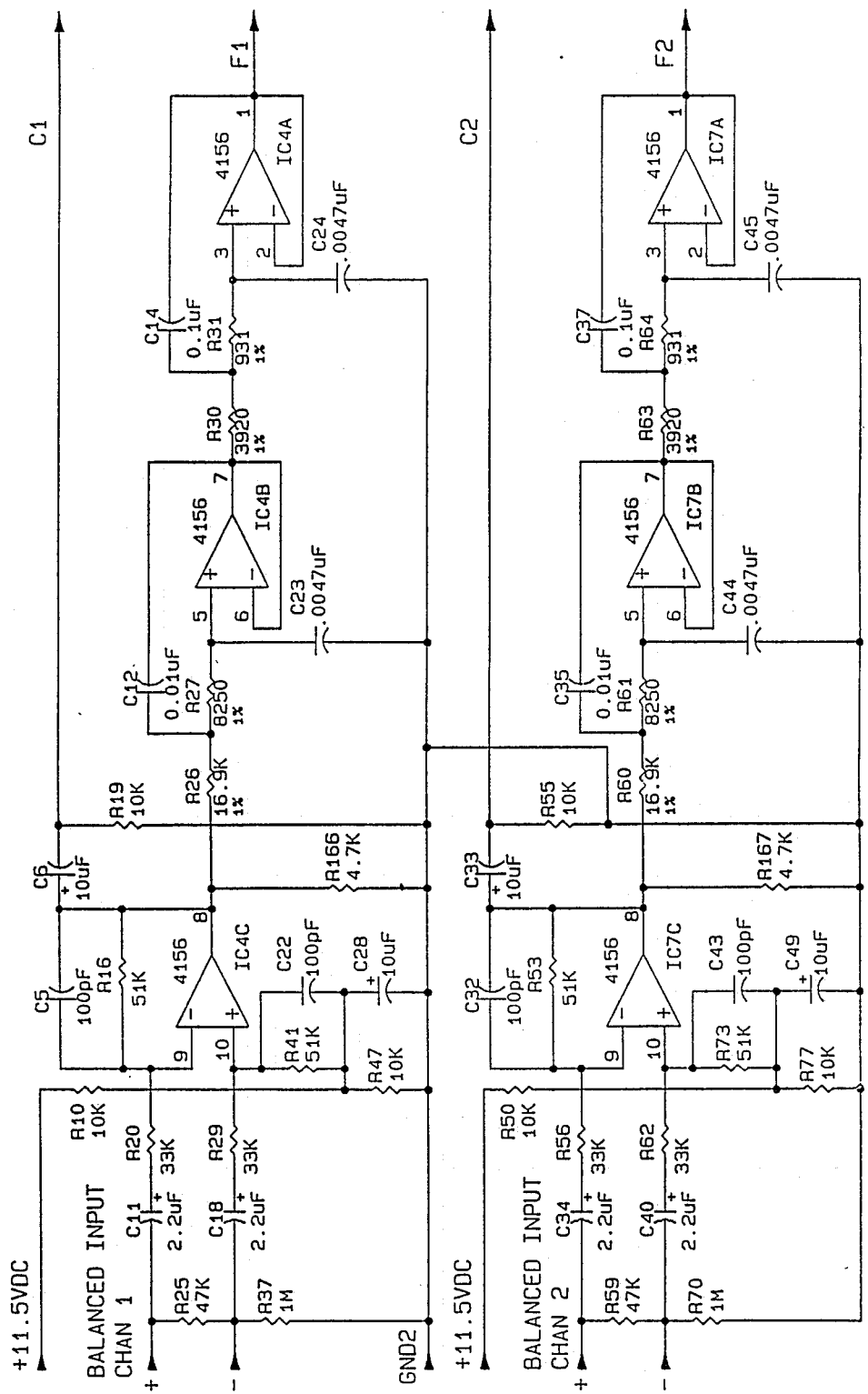
FIGS. 7-21 are detailed schematic diagrams of the presently preferred embodiment of the present invention.
Figure 8:
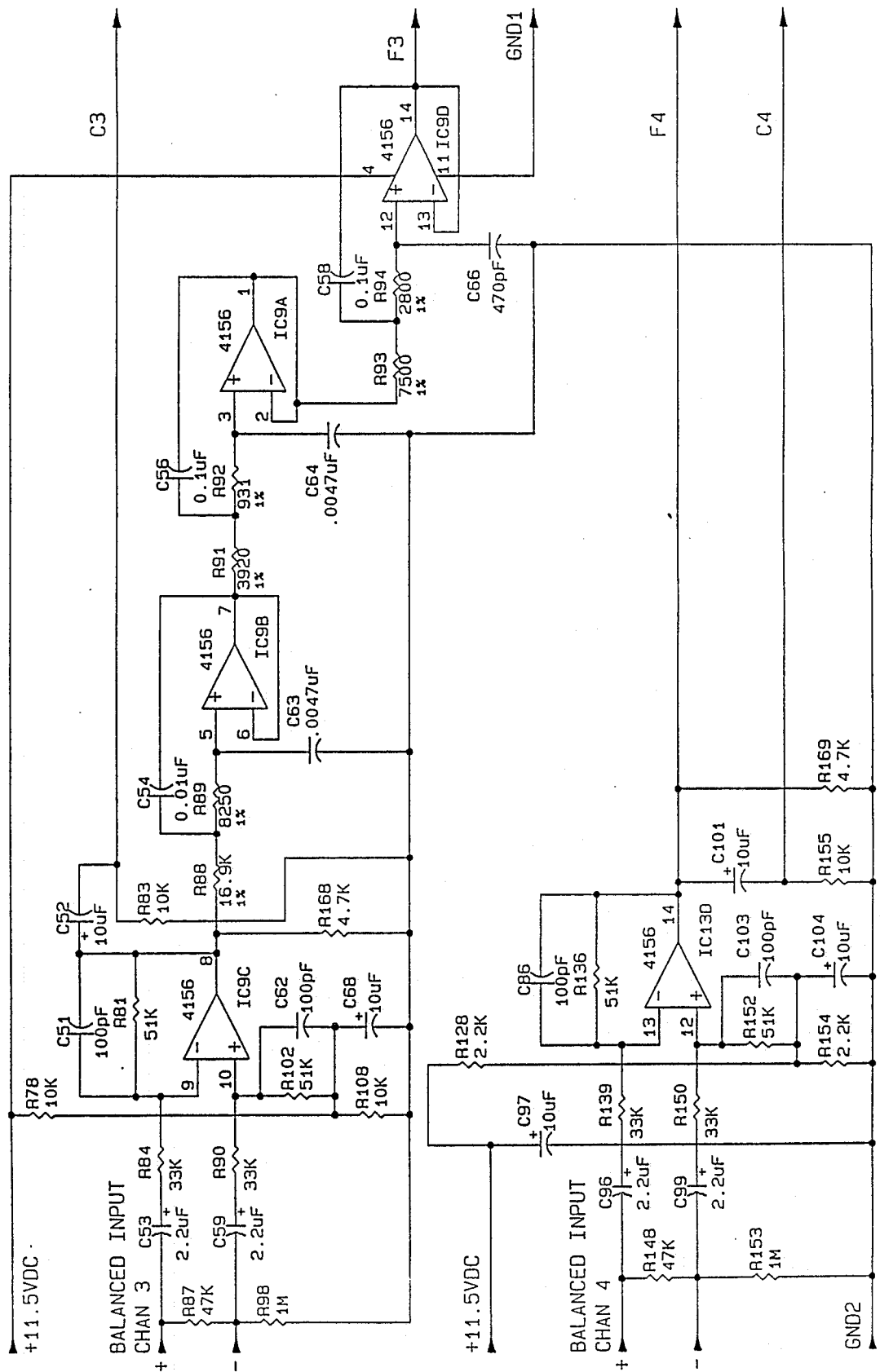
Figure 9:
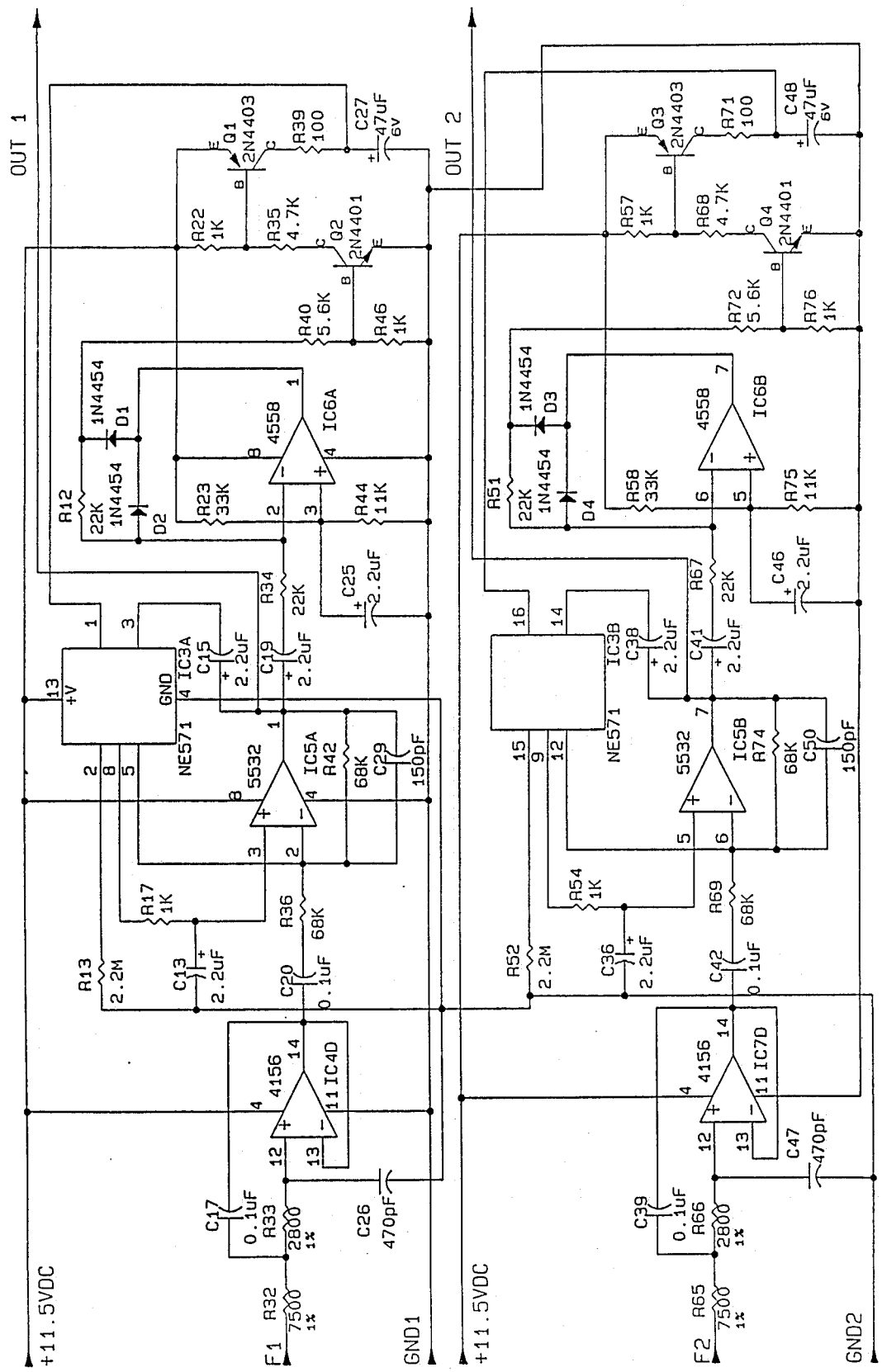
Figure 10:
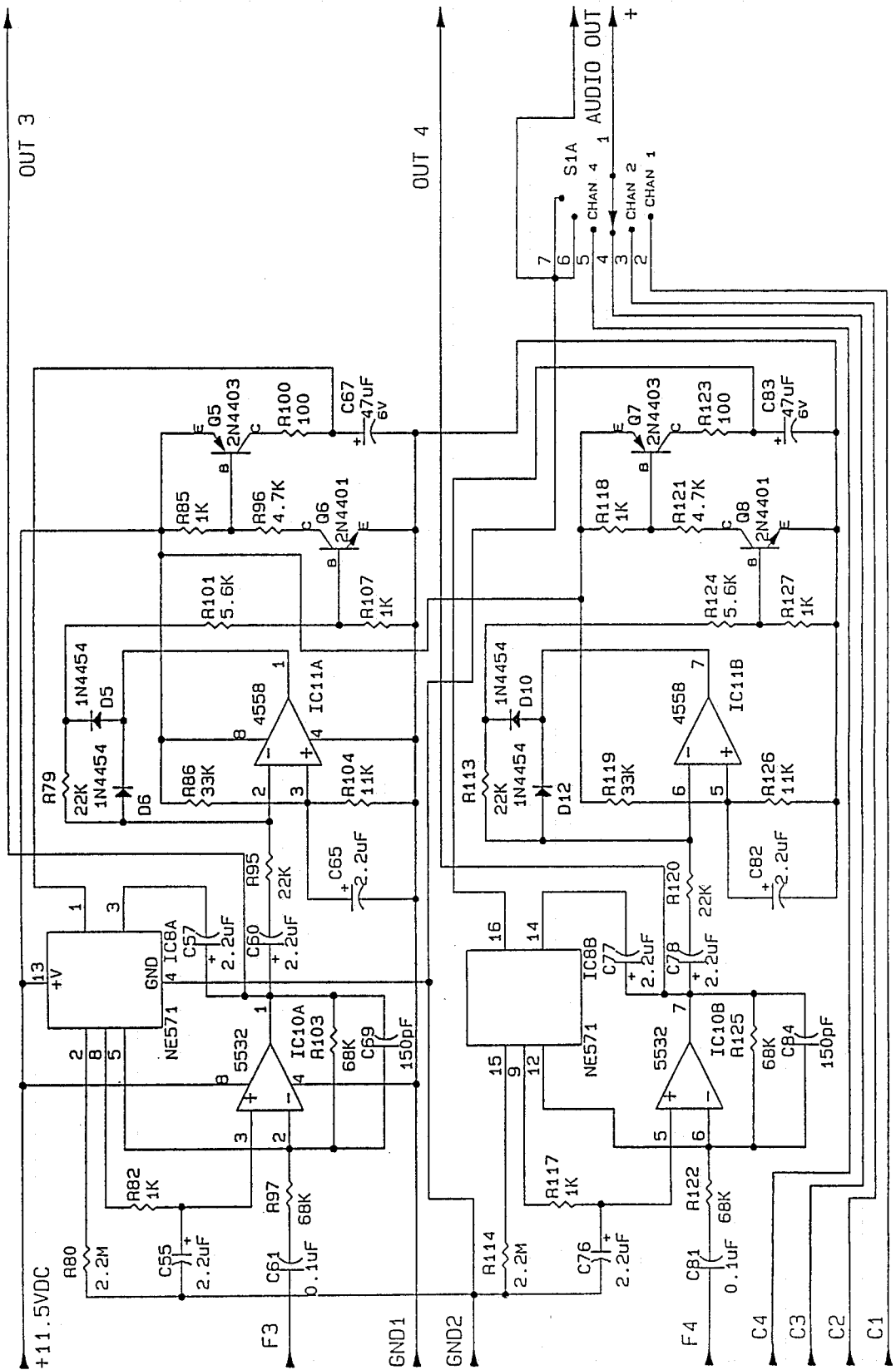
Figure 11:
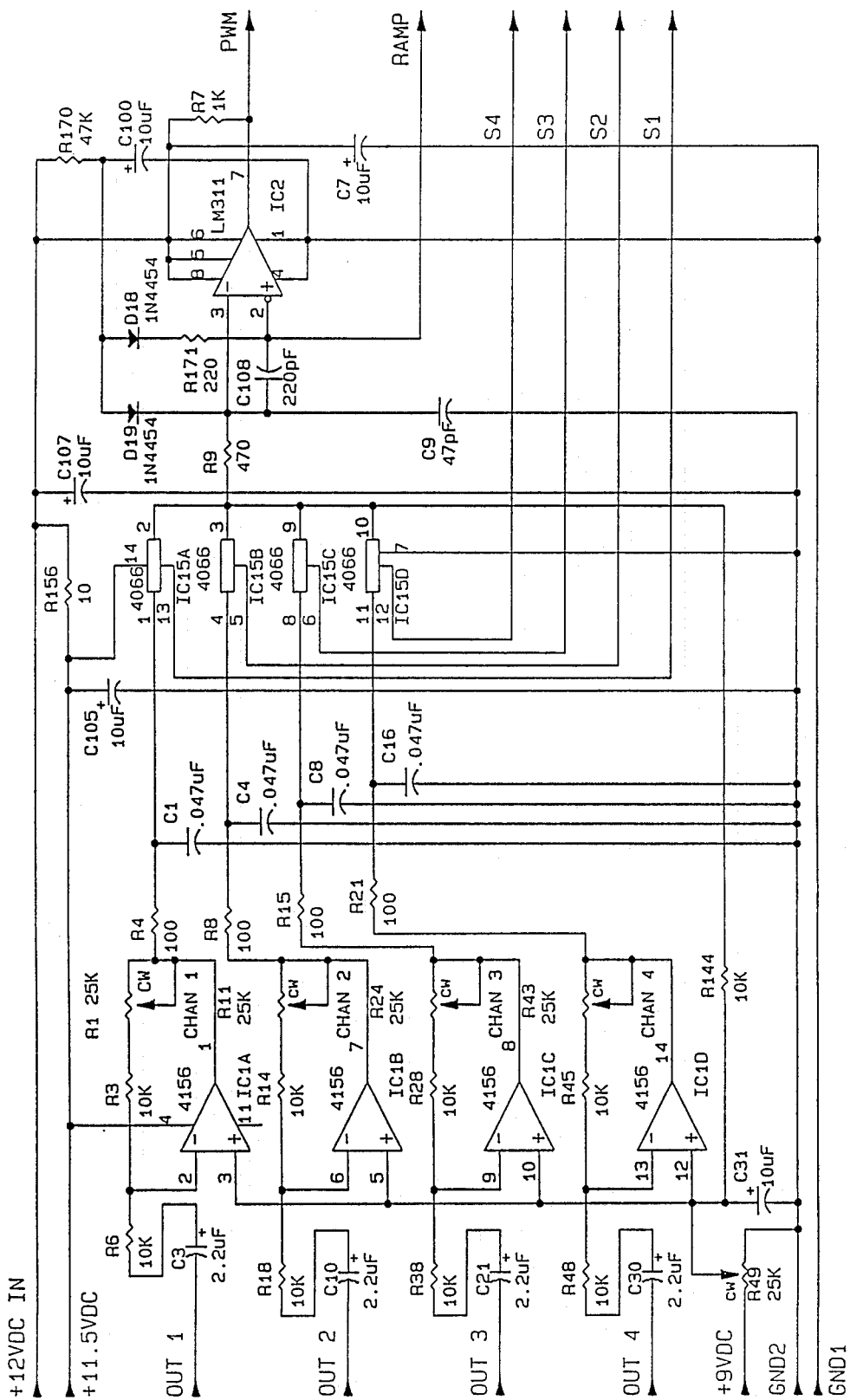
Figure 12:
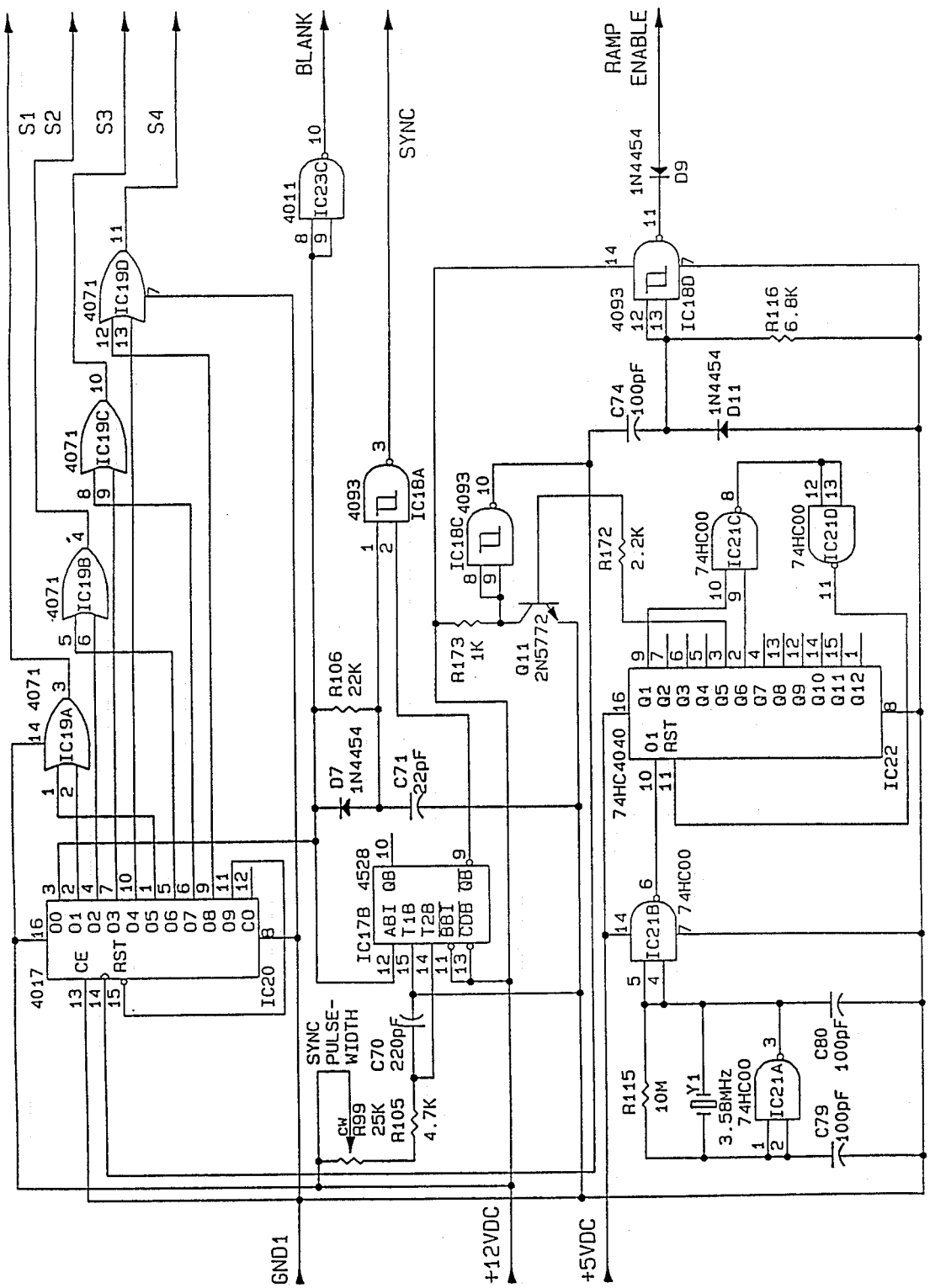
Figure 13:
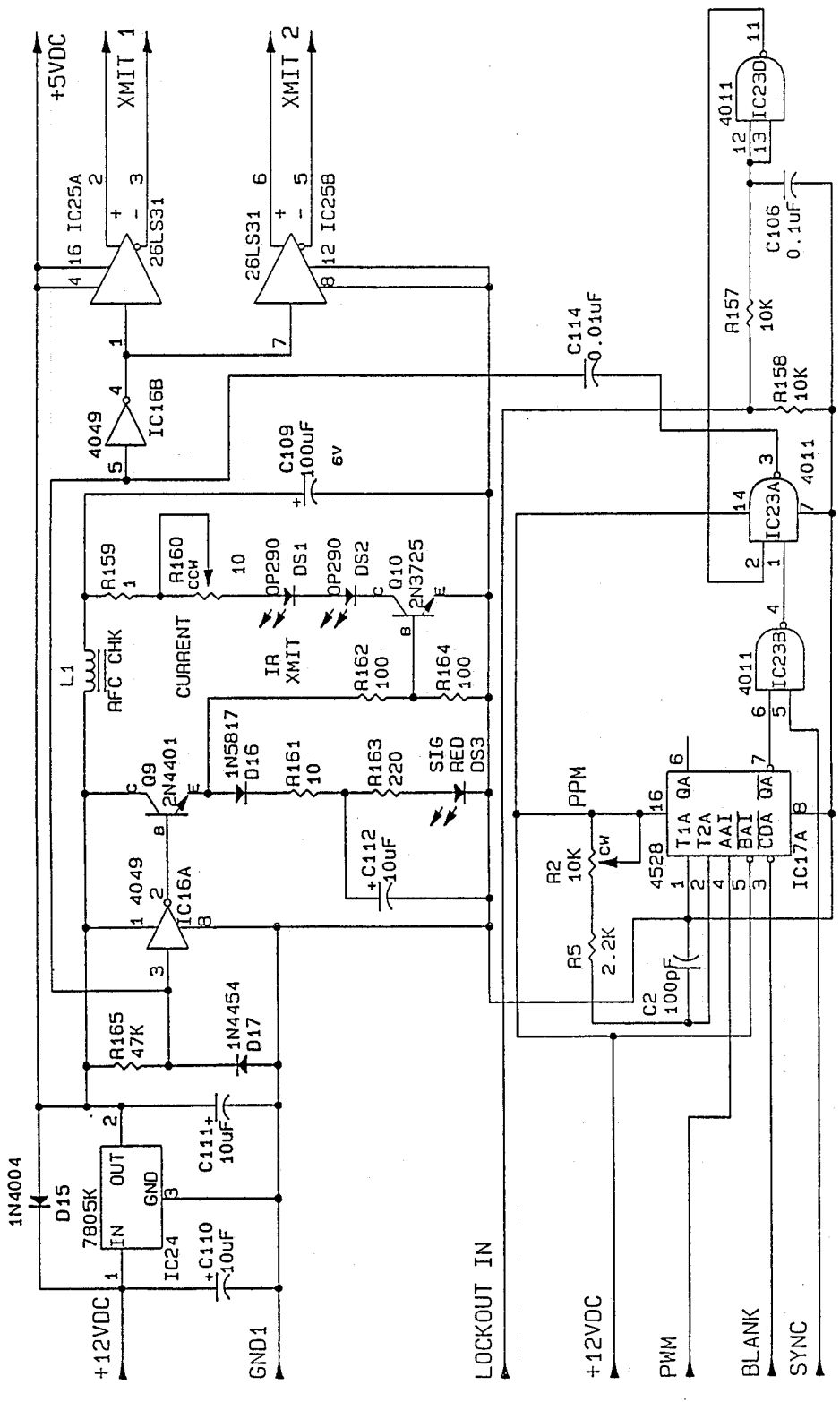
Figure 14:
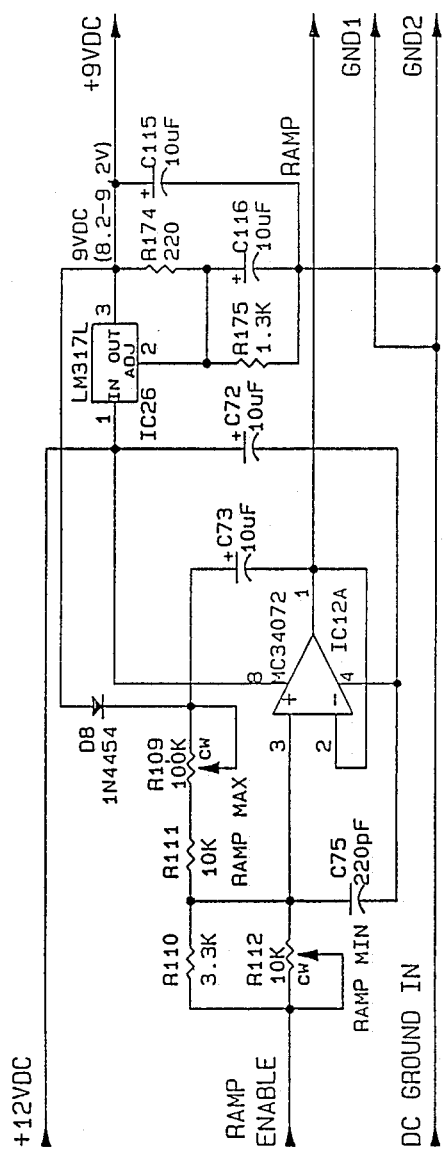

At the output of comparator 312 the received composite signal includes the pulse position modulated signal as well as the sync pulse as represented at wave form K in FIG. 6.

It will be noted that in FIG. 5 a signal level detector 314 is provided to monitor the output of amplifier 310. The purpose of signal level detector 314 is to disable or squelch the audio output of the receiver if the output of voltage amplifier 310 falls below a predetermined level at which a "clean" audio signal can be provided to the user. As can be seen in FIG. 5, the output of signal level detector 314 is connected to one input of AND gate 320. Thus, if the output of signal level detector 314 is not asserted, the audio output will be disabled as will become clear shortly.

The output of comparator 312, as shown at wave form K in FIG. 6, is passed onto sync separator 316. Sync separator 316 detects the trailing edge of the sync pulse in the received composite signal by monitoring the widths of the pulses in the received composite signal. Sync separator 316 is designed so as to not detect the short pulses of the received pulse position modulated signal, but the relatively wide 5.7 microsecond sync pulses are detected.

As shown in FIG. 6 at wave form L, sync separator 316 generates a received sync pulse 3 microseconds after the leading edge of the received composite signal sync pulse occurs. The trailing edge of the received sync pulse represented in wave form L defines the begining of the channel 1 time slot.

As shown in FIG. 5, the output of sync separator 316 is fed to the reset input 318A of oscillator 318. Thus, the received sync pulse resets oscillator 318 which preferably is an RC oscillator which is adjusted to free run at 108.47 KHz. Having a free run frequency of 108.47 KHz provides a pulse every 9.22 microseconds. Thus, oscillator 318 is locked onto the same frequency as the oscillator provided in the encoder portion of the embodiment and is also synchronized so that the time slots of the received composite signal maintain their proper relationship. The output of oscillator 318 is represented in wave form M of FIG. 6.

The clock output of oscillator 318 is applied to the clock input 322A of decade counter 322. With the oscillator output being applied to the clock input of decade counter 322, each of the eight decade counter outputs (322A-322H) is asserted for one time slot. Furthermore, the output of AND gate 320, which is asserted only when both a received sync pulse is applied to AND gate 320 and the output of signal level detector 314 is asserted, is connected to the reset input 322R of decade counter 322 serving to reset the counter sequence. Thus, the output sequence of decade counter 322 is reset every received sync pulse.

A channel selector device 326, which in the described embodiment is preferably a rotary switch of some kind, may selectively be connected to one of the eight decade counter outputs 322A-322H. Consistent with the previously described figures, channel selector 326 is shown being adjusted to select channel 3. The output of decade counter output 322C is represented at wave form N in FIG. 6.

The output of comparator 312 contains the received composite signal containing the received pulse position modulated signal including all eight channels. Thus, a portion, i.e., one time slot, of the received pulse position modulated signal must be selected and the audio information extracted therefrom. Furthermore, it is desirable that the pulse position modulated signal be converted to a pulse amplitude modulated signal. As mentioned previously, it is possible to directly extract the audio information from the selected portion of the pulse position modulated signal. However, greater fidelity results by first converting the received pulse position modulated singal to a received pulse amplitude modulated signal.

The structures which carry out the functions of selecting a portion of the pulse position modulated signal (corresponding to channel 3 in FIG. 5), an well as converting the received pulse position modulated signal to a received pulse amplitude modulated signal will now be described.

The received composite signal output from comparator 312 is applied to reset input 328A of latch 328. As shown in FIG. 5, the set input 328B of latch 328 receives the signal output from the 1 time slot advance circuit 330. The 1 time slot advance circuit 330 operates by delaying the channel select signal (wave form N in FIG. 6) eight time slots (73.76 microseconds) thus effectively advancing the channel select signal one time slot. The output of one time slot advance circuit 330 is referred to as a ramp reset signal and is represented by wave form O in FIG. 6. As illustrated in FIG. 6, the ramp reset signal is applied to the reset input of ramp generator 332.

Referring back to latch circuit 328, reset input 328A receives the received composite signal which is output from comparator 312 and set input 328B receives the ramp reset signal from circuit 330. Thus, output 328C (referred to as the ramp enable signal represented at wave form P in FIG. 6) of latch circuit 328 goes high on the loading edge of the ramp reset signal and goes low upon the leading edge of the appropriate pulse of the pulse position modulated signal, (as shown at the channel 3 time slot in FIG. 6).

Because the ramp reset signal goes low at the beginning of the selected channel's time slot, the output of the ramp generator begins to ramp up at the beginning of the appropriate time slot, and upon the occurrence of a pulse received in the pulse position modulated signal in the same time slot (i.e., upon the removal of the ramp enable signal), the output of ramp generator 332 ceases to ramp upward and assumes a steady state condition. The output of ramp generator 332 is represented at wave form Q in FIG. 6 and labeled ramp output. Thus, the "final state" of the output of ramp generator 332, as represented at wave form Q in FIG. 6, corresponds to the instantaneous level of the audio signal to ultimately be reconstructed. As noted in FIG. 6 at wave form Q, the output of ramp generator 332 may vary between a 2 volt minimum and a 10 volt maximum.

As represented in FIG. 5, ramp gate 336 is provided to prevent portions of the ramp generator output other than the final steady state from being passed along to low pass filter 338. As represented in FIG. 5, the ramp gate circuit is operated by the output of NOR gate 334. It can be seen that in order to assert the output of NOR gate 334, either the output from 1 time slot advance circuit 330 must be low or the channel select signal must be low.

Wave from R in FIG. 6 shows the output of NOR gate 334 and indicates that gate circuit 336 is only enabled to allow signal passage after it is ensured that the ramp output has reached its steady final state. Thus, the output of gate circuit 336 is the received pulse amplitude modulated signal derived from the selected channel of the received pulse position modulated signal which was obtained from the received composite signal which in turn was derived from the optical signal broadcast by the transmitter of the described embodiment.

It will be noted that the first portion of wave form S (prior to assertion of the ramp gating signal) in FIG. 6 represents the amplitude obtained during the previous frame while the second portion of wave form S (after the assertion of the ramp gating signal) in FIG. 6 represents the amplitude corresponding to the pulse contained within the time slot for channel 3.

The received pulse amplitude modulated signal which is output from ramp gate 336 may be processed by low pass filter 338 in order to recreate the original audio signal. Low pass filter 338 is preferably a 5.5 kilohertz sixth order low pass filter.

The output of low pass filter 338 is processed by volume control 340 which may preferably be a potentiometer which cna be manipulated by the user. The output of volume control 340 may then be amplified by headphone amplifier 342 and then presented to the headphone output generally represented at 344 in FIG. 5.

The present invention provides great advantages over the previously available systems and methods for cableless communications of audio information between two points. In particular, the present invention has advantages where it is necessary to broadcast audio information in an area such as a room wherein the users must receive the audio information without disturbing others. Furthermore, the present invention incorporates an elegant design which allows low cost components to be used while providing a high quality audio signal to the user.

Moreover, the present invention provides a cableless communication system which may accomodate a plurality of channels, each channel carrying a different audio signal. The number of channels may advantageously be altered according to particular needs of the situation. Furthermore, the cableless communication system of the present invention provides superior signal to noise ratios compared to previously available communication systems suited to the same applications.

Figure 15:
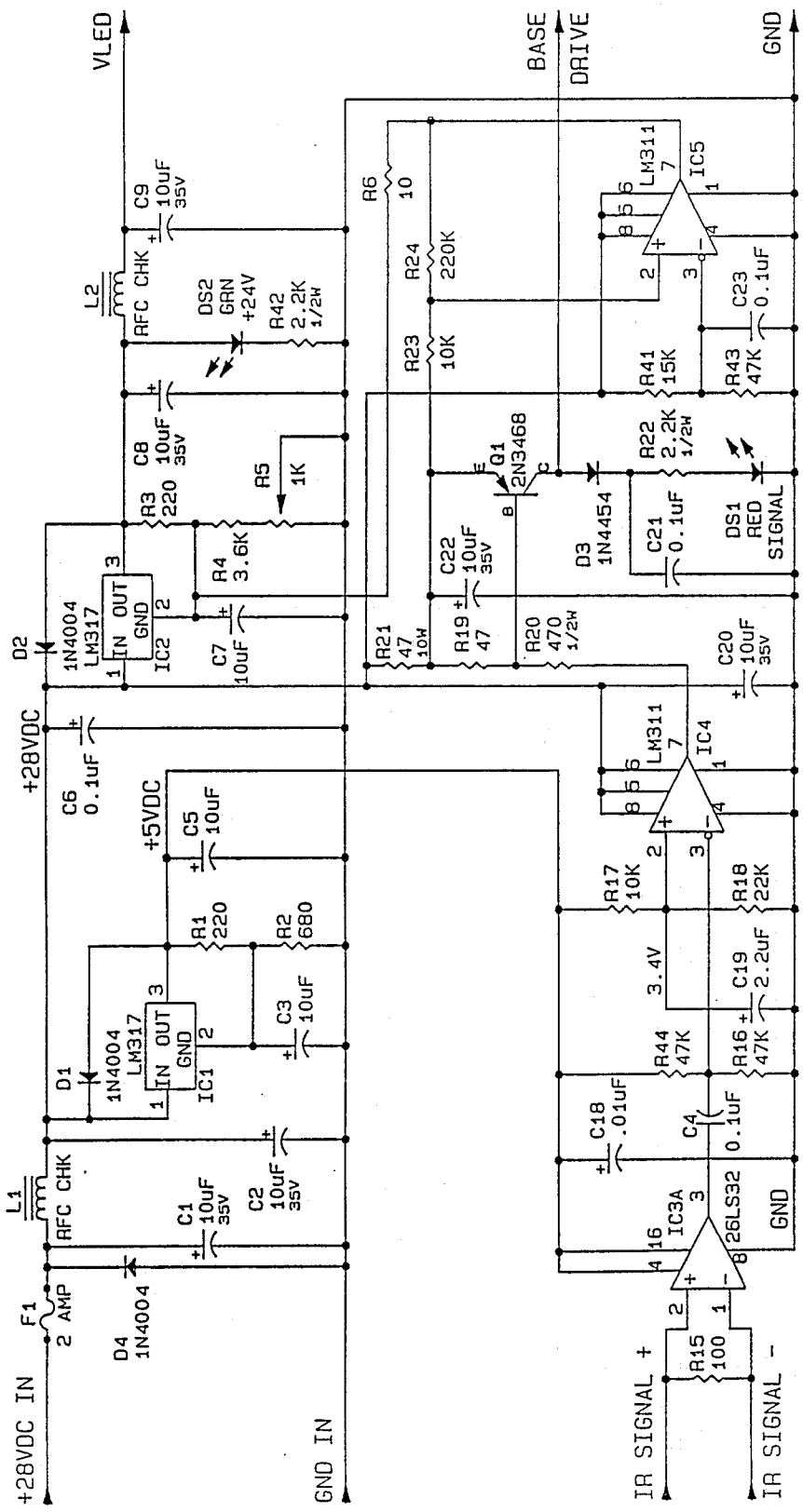
Figure 16:
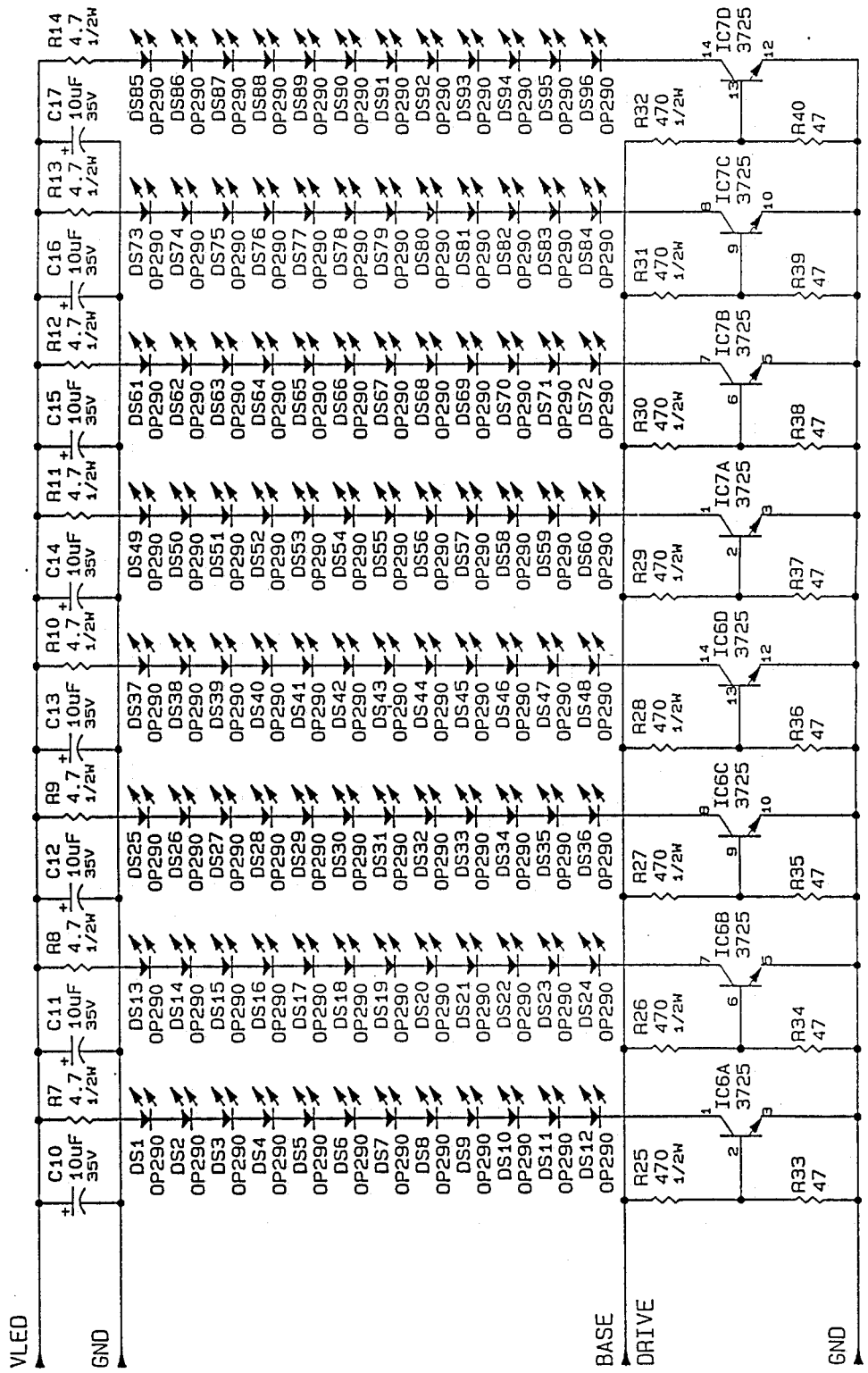
Figure 17:
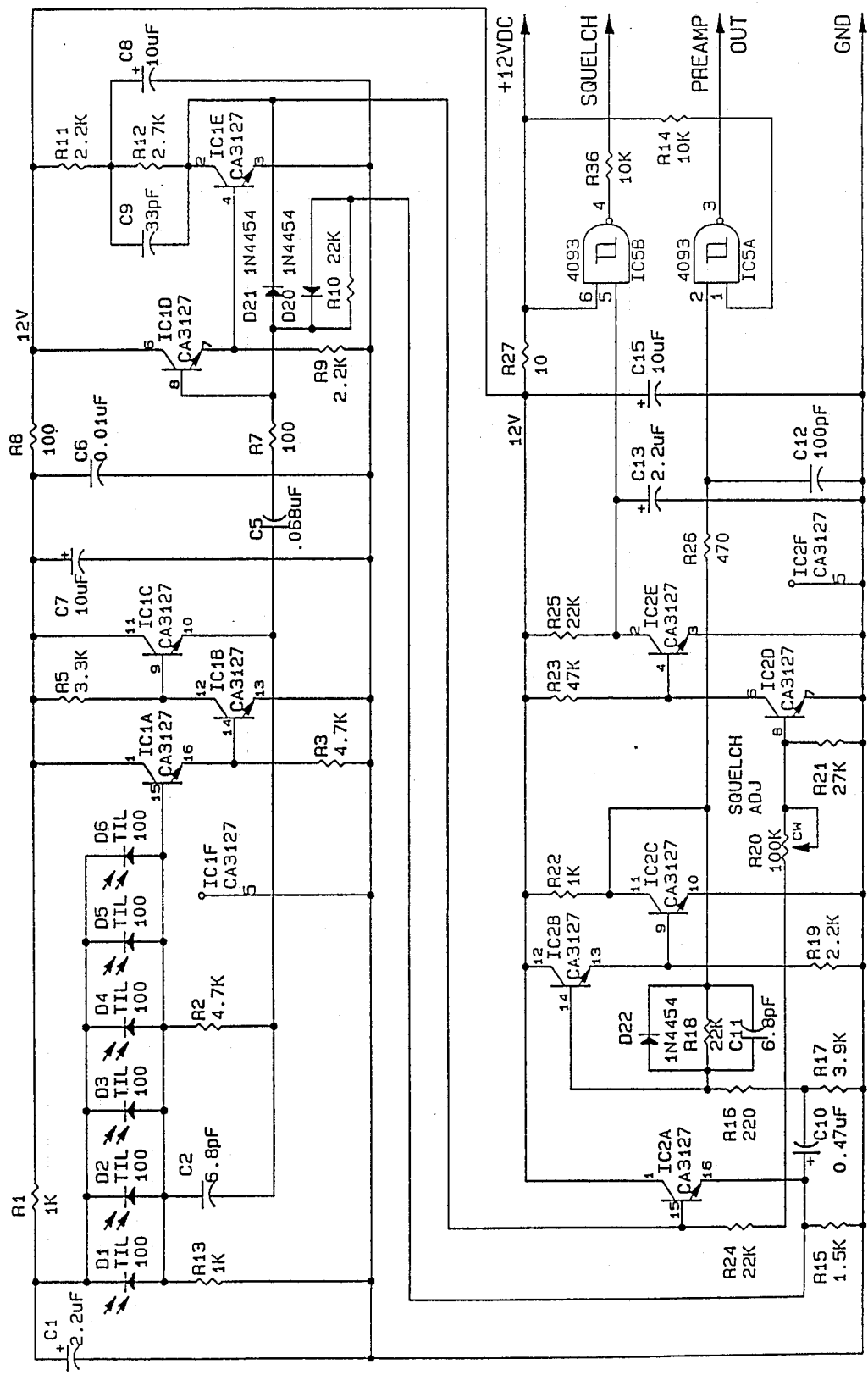
Figure 18:
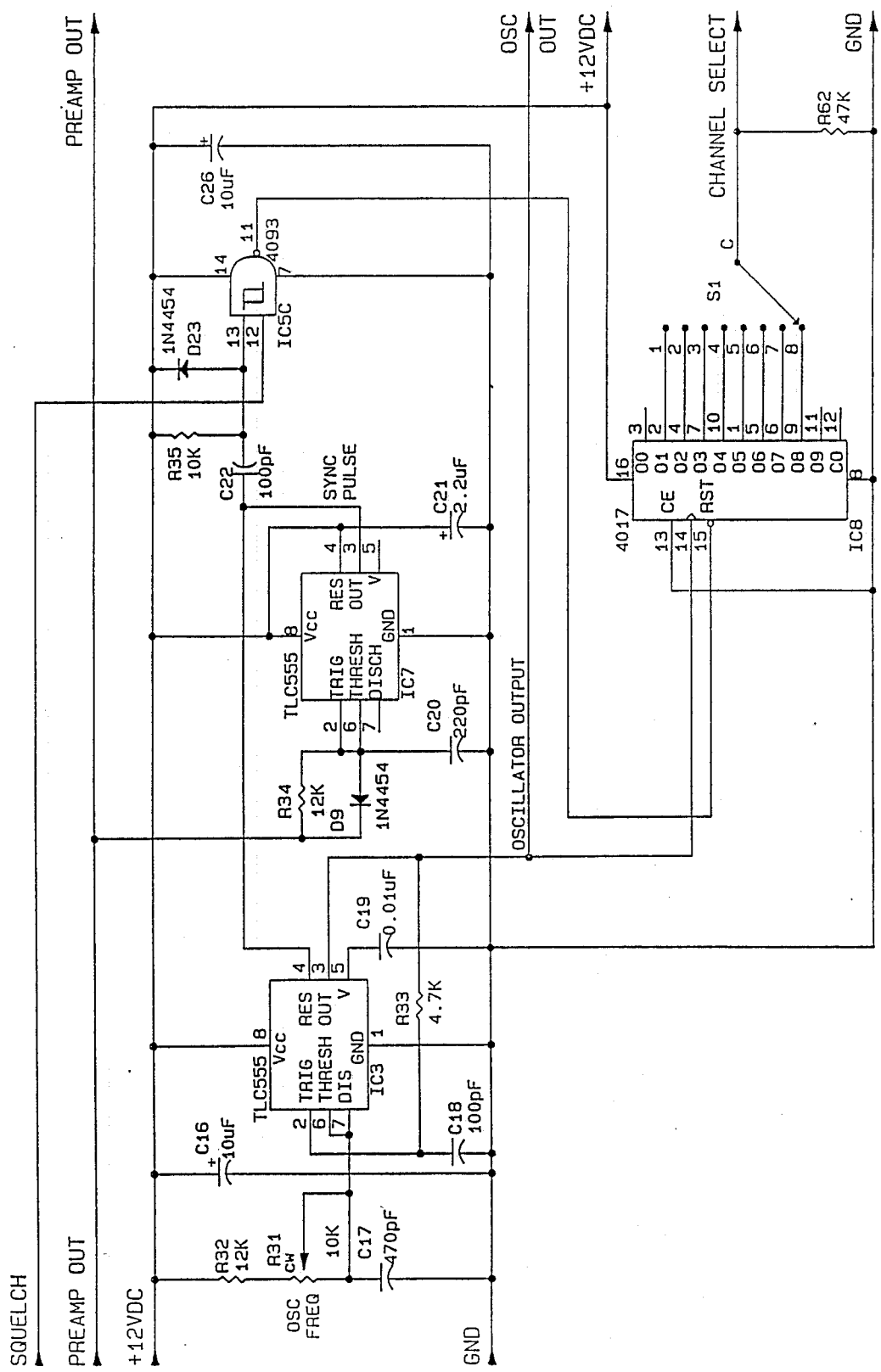
Figure 19:
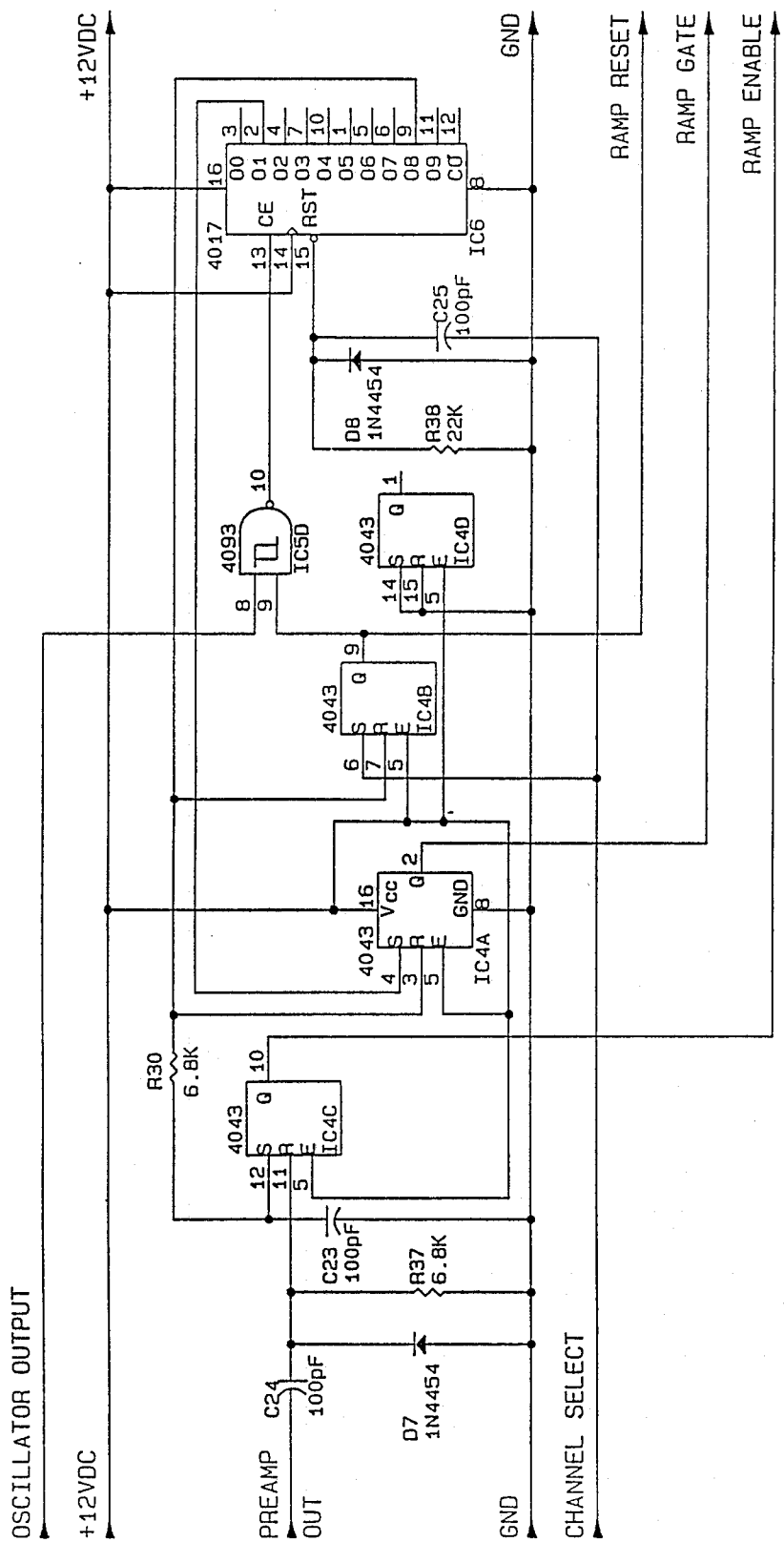
Figure 20:
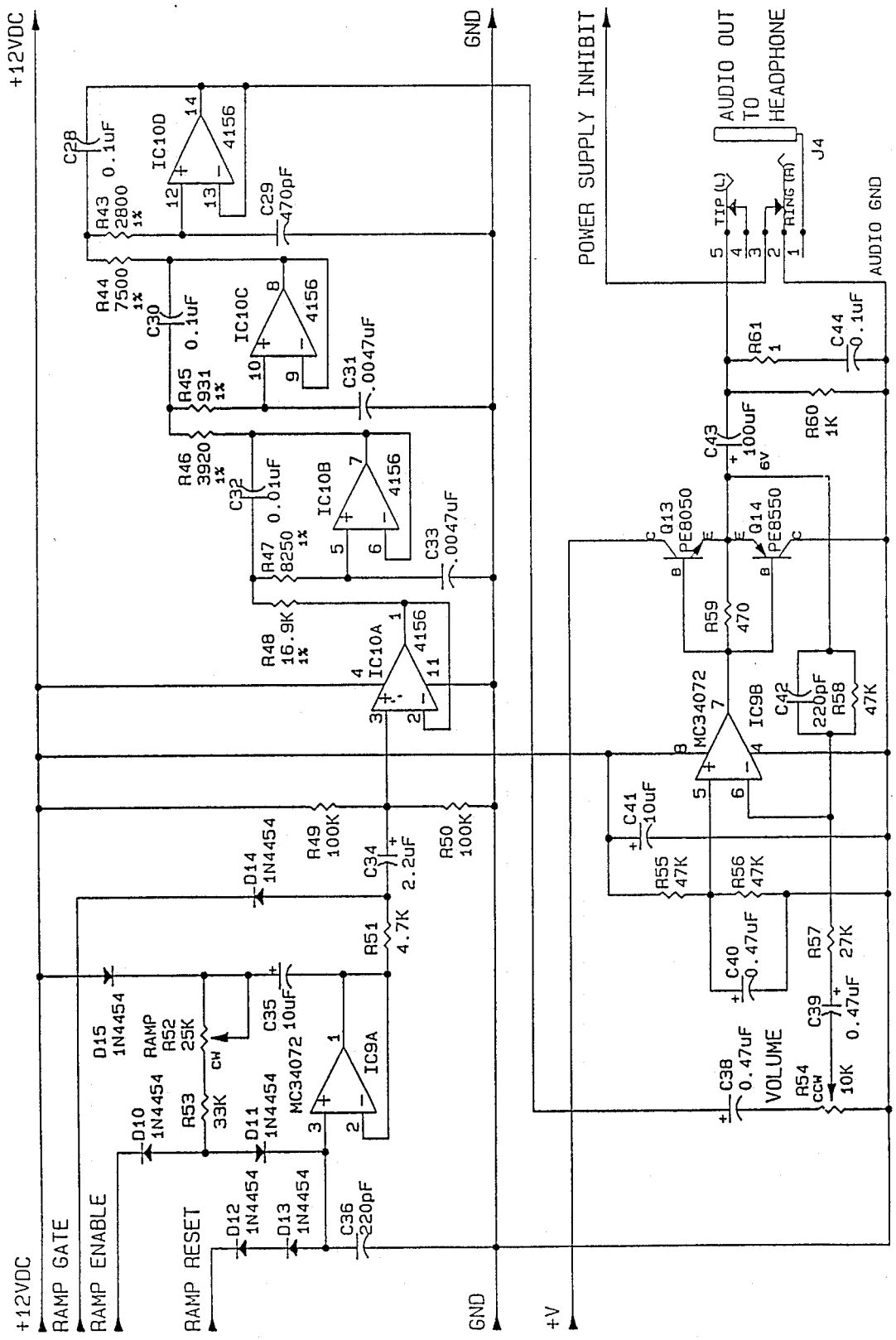

In connection with the functional block diagrams which have been previously described, FIGS. 7-21 represent detailed electric schematic diagrams showing the electrical components of the described embodiment. FIGS. 7-14 include detailed schematic diagrams for four channels of an eight channel encoder according to the concepts previously described in this disclosure. FIGS. 15-16 include detailed schematic diagrams of the transmitter portion described earlier herein. FIGS. 17-21 include detailed schematic diagrams of the receiver of the described embodiment.

In order to maintain maximum clarity of FIGS. 7-21, the reference designations and the symbols commonly used in the art on detailed schematic diagrams have been retained in these figures. Also, a parts list giving the details concering each of the components referenced in FIGS. 7-21 are included in the tables provided below.

The parts list for the encoder portion of the embodiment (FIGS. 7-14) is included in Table I below. The parts list .for the transmitter portion of the described embodiment (FIGS. 15-16) is provided below in Table II. The pats list for the receiver portion of the presently preferred embodiment (illustrated in FIGS. 17-21) is contained in Table III below.

TABLE I
ENCODER
(FIGS. 7-14)

| Description | Reference Designators |
|---|---|
| CAP, 100 UFD 6 V ELECT | C109 |
| CAP, 10 UFD 20 V TANTALUM | C5,7,28,31,33,49,52,68,72, 73,97,100,101,104,105, 107,110-112,115,116 |
| CAP, 2.2 UFD 20 V TANTALUM | C3,10,11,13,15,18,19,21, 25,30,34,36,38,40,41,46, 53,55,57,59,60,65 |
| CAP, 2.2 UFD 20 V TANTALUM | 76,77,78,82,96,99 |
| CAP, 47 UFD 6 V TANTALUM | C27,48,67,83 |
| CAP, 100 PFD CERAMIC | C2,5,22,32,43,51,62,74,79, 80,86,103 |
| CAP, 150 PFD CERAMIC | C29,50,69,84,98 |
| CAP, 22 PFD CERAMIC | C71 |
| CAP, 220 PFD CERAMIC | C70,75,108 |
| CAP, 47 PFD CERAMIC | C9 |
| CAP, 470 PFD CERAMIC | C26,47,66, |
| CAP, .01 UFD 100 V MYLAR | C12,35,54,114 |
| CAP, .1 UFD 100 V MYLAR | C14,17,20,37,39,42,56,58, 61,81,106 |
| CAP, .0047 UFD 100 V MYLAR | C23,24,44,45,63,64 |
| CAP, .047 UFD 100 V MYLAR | C1,4,8,16 |
| DIODE, 300 MA 50 V 1N4454 | D1-12,17,18,19 |
| DIODE, 1 A 400 V 1N4004 | D15 |
| SCHOTTKY, 1 A 20 V 1N5817 | D16 |
| LED RED, .2 HIEFF | DS3 |
| LED, I/R EMITTING TRW-OP290-A | DS1,DS2 |
| CHOKE, RFC INDUCTOR Ferrox VK-200-10-3B | L1 |
| TRAN, NPN 40 V 600 MA 1.5 W 2N4401 | Q2,4,6,8,9 |
| TRAN, NPN 50 V 500 MA 3.52 2N3725 | Q10 |
| TRAN, NPN 15 V 50 MA 1 W 2N5772 | Q11 |
| TRAN, PNP 40 V 600 MA 625 MW 2N4403 | Q1,3,5,7 |
| RESISTOR, ¼ W 5% 100 OHM | R4,8,15,21,39,71,100,123, 162,164 |
| RESISTOR, ¼ W 5% 1 K | R7,17,22,46,54,57,76,82, 85,107,117,118,127,173 |
| RESISTOR, ¼ W 5% 10 K | R3,6,10,14,18,19,28,38,45, 47,48,50,55,77,78,83,108, 111,144,155 |
| RESISTOR, ¼ W 5% 10 K | R157,R158 |
| RESISTOR, ¼ W 5% 1 M | R37,70,98,153 |
| RESISTOR, ¼ W 5% 10 M | R115 |
| RESISTOR, ¼ W 5% 10 OHM | R156,R161 |
| RESISTOR, ¼ W 5% 11 K | R44,75,104,126 |
| RESISTOR, ¼ W 5% 1.3 K | R175 |
| RESISTOR, ¼ W 5% 1 OHM | R159 |
| RESISTOR, ¼ W 5% 220 OHM | R163,171,174 |
| RESISTOR, ¼ W 5% 2.2 K | R5,128,154,172 |
| RESISTOR, ¼ W 5% 22 K | R12,34,51,67,79,95,106, 113,120 |
| RESISTOR, ¼ W 5% 2.2 M | R13,52,80,114 |
| RESISTOR, ¼ W 5% 3.3 K | R110 |
| RESISTOR, ¼ W 5% 33 K | R20,23,29,56,58,62,84,86, 90,119,139,150 |
| RESISTOR, ¼ W 5% 470 OHM | R9 |
| RESISTOR, ¼ W 5% 4.7 K | R35,68,96,105,121,166, 167,168,169 |
| RESISTOR, ¼ W 5% 47 K | R25,59,87,148,165,170 |
| RESISTOR, ¼ W 5% 51 K | R16,41,53,73,81,102,136, 152 |
| RESISTOR, ¼ W 5% 5.6 K | R40,72,101,124 |
| RESISTOR, ¼ W 5% 6.8 K | R116 |
| RESISTOR, ¼ W 5% 68 K | R36,42,69,74,97,103,122, 125 |
| RSTR, 16.9 K ¼ W 1% | R26,60,88 |
| RSTR, 2.8 K ¼ W 1% | R33,66,94 |
| RSTR, 3.92 K ¼ W 1% | R30,63,91 |
| RSTR, 7.5 K ¼ W 1% | R32,65,93 |
| RSTR, 8.25 K ¼ W 1% | R27,61,89 |
| RSTR, 931 OHM ¼ W 1% | R31,64,92 |

TABLE I-continued
ENCODER
(FIGS. 7-14)

| Description | Reference Designators |
|---|---|
| TRIMPOT, 10 K | R2,R112 |
| TRIMPOT, 100 K | R109 |
| TRIMPOT, 10 OHM | R160 |
| TRIMPOT, 25 K | R1,11,24,43,49,99,140 |
| SWITCH, ROTARY DP6T Alco, DRS2-6 | S1 |
| COMPANDOR NE571N | IC3,8 |
| VOLTAGE COMPARATOR LM311N | IC2 |
| HIGH SLEW WB OP AMP MC34072P | IC12 |
| QUAD OP AMP 4156 | IC1,4,7,9 |
| DUAL OP AMP 4558 | IC6,11 |
| DUAL OP AMP 5532 | IC5,10 |
| 3 TERM ADJ REG 100 MA T092 LM317LZ | IC26 |
| VOLTAGE REGULATOR 5 V T03 MC7805CK | IC24 |
| QUAD 2-IN NAND SCHMITT TG 4093 | IC18 |
| DUAL MONOSTABLE MULTIVIBR 4528 | IC17 |
| CMOS HEX INVERTING BUFFER 4049B | IC16 |
| CMOS BILATERAL SWITCH 4066 | IC15 |
| CMOS QUAD 2 INPUT NAND 4011 | IC23 |
| QUAD 2 INPUT OR GATE 4071 | IC19 |
| QUAD 2 IN NAND GATE HC SN74HC00N | IC21 |
| COUNTER/DIVIDER 10 OUTPUT 4017 | IC20 |
| 12 BIT BINARY COUNTER HC SN74HC4040N | IC22 |
| QUAD LINE DRIVER 26LS31 | IC25 |
| CRYSTAL, 3.579 MHZ | Y1 |

TABLE II
TRANSMITTER
(FIGS. 15-16)

| Description | Reference Designators |
|---|---|
| CAP, 10 UFD 35 V TANTALUM | C1,2,3,5,7-17,20,22 |
| CAP, 2.2 UFD 20 V TANTALUM | C19 |
| CAP, .01 UFD 100 V MYLAR | C18 |
| CAP, .1 UFD 100 V MYLAR | C4,6,21,23 |
| DIODE, 300 MA 75 V 1N4454 | D3 |
| DIODE, 1 A 400 V 1N4004 | D1,2,4 |
| LED RED, .2 HIEFF | DS1 |
| LED GRN, .2 HIEFF | DS2 |
| FUSE, 2 AMP SLO BLO | F1 |
| CHOKE, RFC INDUCTOR Ferrox VK-200-10-3B | L1,L2 |
| TRAN, PNP 50 V 1 A 5 W 2N3468 | Q1 |
| RESISTOR, ¼ W 5% 100 OHM | R15 |
| RESISTOR, ¼ W 5% 10 K | R17,23 |
| RESISTOR, ¼ W 5% 10 OHM | R6 |
| RESISTOR, ¼ W 5% 15 K | R41 |
| RESISTOR, ¼ W 5% 220 OHM | R1,R3 |
| RESISTOR, ¼ W 5% 22 K | R18 |
| RESISTOR, ¼ W 5% 220 K | R24 |
| RESISTOR, ¼ W 5% 3.6 K | R4 |
| RESISTOR, ¼ W 5% 47 K | R16,43,44 |
| RESISTOR, ¼ W 5% 47 OHM | R19,33-40 |
| RESISTOR, ¼ W 5% 680 OHM | R2 |
| RESISTOR, ¼ W 5% 82 OHM | R45-54 |

TABLE II-continued
TRANSMITTER
(FIGS. 15-16)

| Description | Reference Designators |
|---|---|
| RESISTOR, ⅛ W 2.2 K | R22,R42 |
| RESISTOR, ⅛ W 470 OHM | R20,25-32 |
| RESISTOR, ⅛ W 4.7 OHM | R7-14 |
| RSTR, 47 OHM 10 WATT 10% | R21 |
| TRIMPOT, 1 K | R5 |
| VOLTAGE COMPARATOR LM311 | IC4,IC5 |
| 3 TERM ADJ REG 1.5 AMP LM317K | IC1,IC2 |
| QUAD LINE RECEIVER 26LS32 | IC3 |
| QUAD TRANSISTOR ARRAY MPQ3725 | IC6,IC7 |
| LED, I/R EMITTING TRW-OP290-A | DS1-96 |

TABLE III
RECEIVER
(FIGS. 17-21)

| Description | Reference Designators |
|---|---|
| BATTERY CELL AA FAST CHG NICAD | BT1,2,3 |
| CAP, 100 UFD 6 V ELECT | C43,51 |
| CAP, 47 UFD 16 V ELECT | C45,46,48,49,50 |
| CAP, 10 UFD 20 V TANTALUM | C35,41,47,53 |
| CAP, 2.2 UFD 20 V TANTALUM | C34 |
| CAP, .47 35 V TANTALUM | C38,39,40 |
| CAP, 220 PFD CERAMIC | C36,C42 |
| CAP, 470 PFD CERAMIC | C29,52 |
| CAP, .01 UFD 100 V MYLAR | C32 |
| CAP, .1 UFD 100 V MYLAR | C28,30,44,54 |
| CAP, .0047 UFD 100 V MYLAR | C31,33 |
| DIODE, 300 MA 50 V 1N4454 | D10-15,17 |
| DIODE, 1A 400 V 1N4004 | D19 |
| SCHOTTKY, 1 A 20 V 1N5817 | D16 |
| LED, RED LOW POWER HP4700 | DS1 |
| CONTACT POINT, GOLD | X3,X4 |
| PC MOUNT STEREO MINI JACK LZR SJ-362 | J4 |
| SOCKET, RA MOLEX 3 PIN | J5 |
| TOROID, 750 UH 400 MA Amecon 4545 W/55117 | L3 |
| TRAN, NPN 35 V 1.5 A 1.13 W PE8051 | Q13 |
| TRAN, NPN 45 V 200 MA 1.5 W MPSA 18 | Q17 |
| TRAN, PNP 25 V 1.5 A 1.13 W PE 8550 | Q14 |
| TRAN, PNP 40 V 600 MA 625 MW 2N4403 | Q16 |
| TRAN, PNP 40 V 4 A 40 W 2N5193 | Q15 |
| RESISTOR, ¼ W 5% 100 OHM | R68 |
| RESISTOR, ¼ W 5% 1 K | R60,71,73 |
| RESISTOR, ¼ W 5% 100 K | R49,50 |
| RESISTOR, ¼ W 5% 150 K | R84 |
| RESISTOR, ¼ W 5% 1 OHM | R61 |
| RESISTOR, ¼ W 5% 1.5 OHM | R69,R70 |
| RESISTOR, ¼ W 5% 220 OHM | R72,R79 |
| RESISTOR, ¼ W 5% 2.2 K | R67 |
| RESISTOR, ¼ W 5% 22 K | R75,R76 |
| RESISTOR, ¼ W 5% 220 K | R65 |
| RESISTOR, ¼ W 5% 27 K | R57 |
| RESISTOR, ¼ W 5% 33 K | R53 |
| RESISTOR, ¼ W 5% 390 K | R64 |
| RESISTOR, ¼ W 5% 470 OHM | R59 |
| RESISTOR, ¼ W 5% 4.7 K | R51 |
| RESISTOR, ¼ W 5% 47 K | R55,56,68,62,74 |
| RESISTOR, ¼ W 5% 680 K | R63 |
| RESISTOR, ¼ W 10 OHM | R42,R83 |
| RSTR, 10.7 K 1% | R77 |
| RSTR, 16.9 K ¼ W 1% | R48 |

TABLE III-continued
RECEIVER
(FIGS. 17-21)

| Description | Reference Designators |
|---|---|
| RSTR, 20.5 K ¼ W 1% | R66 |
| RSTR, 2.8 K ¼ W 1% | R43 |
| RSTR, 3.92 K ¼ W 1% | R46 |
| RSTR, 43.2 K ¼ W 1% | R78 |
| RSTR, 7.5 K ¼ W 1% | R44 |
| RSTR, 8.25 K ¼ W 1% | R47 |
| RSTR, 931 OHM ¼ W 1% | R45 |
| POT, 10 K VOLUME CONTROL | R54 |
| TRIMPOT, 25 K | R52 |
| SWITCH, 12 POS THUMBWHEEL Shadow 861307 | S1 |
| DC TO DC CONVERTER MC 34063P | IC11 |
| HIGH SLEW WB OP AMP MC34072P | IC9 |
| QUAD OP AMP 4156 | IC10 |
| COUNTER/DIVIDER 10 OUTPUT 4017 | IC8 |
| CAP, 10 UFD 20 V TANTALUM | C7,8,15,16,26 |
| CAP, 2.2 UFD 20 V TANTALUM | C1,21,C13 |
| CAP, .47 35 V TANTALUM | C10 |
| CAP, 100 PFD CERAMIC | C12,18,22-25 |
| CAP, 220 PFD CERAMIC | C20 |
| CAP, 33 PFD CERAMIC | C9 |
| CAP, 470 PFD CERAMIC | C17 |
| CAP, 6.8 PFD CERAMIC | C2,C11 |
| CAP, .01 UFD 100 V MYLAR | C6,19 |
| CAP, .1 UFD 100 V MYLAR | C5,C13 |
| DIODE, 300 MA 50 V 1N4454 | D7-9,20-23 |
| DIODE, DETECTOR TI L100 | D1-D6 |
| RSTR 100 OHM ⅛ W 5% | R7,48 |
| RSTR 1 K ⅛ W 5% | R1,13,22 |
| RSTR 10 K ⅛ W 5% | R14,35,36 |
| RSTR 10 OHM ⅛ W 5% | R27 |
| RSTR 12 K ⅛ W 5% | R32,34 |
| RSTR 1.5 K ⅛ W 5% | R15 |
| RSTR 220 OH ⅛ W 5% | R16 |
| RSTR 2.2 K ⅛ W 5% | R9,11,19 |
| RSTR 22 K ⅛ W 5% | R10,18,24,25,38 |
| RSTR 2.7 K ⅛ W 5% | R12 |
| RSTR 27 K ⅛ W 5% | R21 |
| RSTR 3.3 K ⅛ W 5% | R5 |
| RSTR 3.9 K ⅛ W 5% | R17 |
| RSTR 470 OHM ⅛ W 5% | R26 |
| RSTR 4.7 K ⅛ W 5% | R2,3,33 |
| RSTR 47 K ⅛ W 5% | R23 |
| RSTR 6.8 K ⅛ W 5% | R30,R37 |
| TRIMPOT, 10 K 12 TURN | R31 |
| TRIMPOT, 100 K 12 TURN | R20 |
| QUAD TRI-STATE NOR LATCH 4043 | IC4 |
| QUAD 2-IN NAND SCHMITT TG 4093 | IC5 |
| TIMER, CMOS TLC555C | IC3,7 |
| COUNTER/DIVIDER 10 OUTPUT 4017 | IC6 |
| TRANSISTOR ARRAY, HF NPN MPQ 3725 | IC1,IC2 |

The invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to the secured by United States Letters Patent is:

1. A system for simultaneously transmitting a plurality of audio signals from a first point through an enclosed space to at least one second point in said enclosed space, the system comprising:

input means for simultaneously inputting the plurality of audio signals to the system;

multiplexing means for time-division multiplexing the plurality of audio signals and generating an encoded pulse amplitude modulated signal containing information from each of the plurality of audio signals, the encoded pulse amplitude signal comprising a plurality of time slots, each of the time slots containing a pulse corresponding to the amplitude of a sampled portion of one of the plurality of audio signals;

first conversion means for converting the encoded pulse amplitude modulated signal into a corresponding encoded pulse position modulated signal, the encoded pulse position modulated signal comprising a plurality of time slots, each time slot having a pulse possessing a length significantly less than the length of the time slot, the position of the pulse within the time slot corresponding to the amplitude of the pulse in a corresponding time slot of the encoded pulse amplitude modulated signal;

transmitter means for broadcasting an optical signal into the enclosed space, the optical signal carrying the encoded pulse position modulated signal;

reception means for receiving the optical signal and for generating a received pulse position modulated signal having a plurality of time slots and pulses corresponding to the time slots and pulses present in the optical signal;

selection means for selecting a portion in the received pulse position modulated signal, the selected portion containing information corresponding to one of said plurality of audio signals; and means for extracting the corresponding information from the selected portion of the received pulse position modulated signal so as to reproduce one of said plurality of audio signals corresponding to said selected portion.

2. A system for simultaneously transmitting a plurality of audio signals as defined in claim 1 wherein the plurality of audio signals comprises at least eight audio signals.

3. A system for simultaneously transmitting a plurality of audio signals as defined in claim 1 wherein the input means comprises a plurality of input amplifiers, at least one input amplifier being connected to receive a corresponding one of the plurality of audio signals.

4. A system for simultaneously transmitting a plurality of audio signals as defined in claim 3 wherein the input means further comprises a low pass filter connected to a corresponding output of each said input amplifier.

5. A system for simultaneously transmitting a plurality of audio signals as defined in claim 4 wherein the input means further comprises a limiter connected to a corresponding output of each said low pass filter, the limiters being adapted for limiting the amplitude of each of the plurality of audio signals.

6. A system for simultaneously transmitting a plurality of audio signals as defined in claim 1 wherein the multiplexing means comprises:

an analog multiplexer having at least as many inputs as audio signals in the plurality of audio signals, said analog multiplexer including means to pass each one of the audio signals to its output; and oscillator means for driving the analog multiplexer such that each of the plurality of audio signals are periodically sampled.

7. A system for simultaneously transmitting a plurality of audio signals as defined in claim 6 wherein the oscillator means comprises an oscillator circuit and a counter circuit, the counter circuit being driven by the oscillator circuit and the counter circuit outputs driving the analog multiplexer causing the sequential passing of each of the audio signals to the analog multiplexer output for one time slot thereby generating the encoded pulse amplitude modulated signal.

8. A system for simultaneously transmitting a plurality of audio signals as defined in claim 1 wherein the first conversion means comprises:

a comparator having first and second inputs;

a ramp generator, the ramp generator output being triggered substantially at the beginning of a time slot, the ramp generator output being applied to a second input to the comparator, the first input to the comparator receiving the encoded pulse amplitude modulated signal; and a one-shot circuit adapted for receiving the output of the comparator and generating a pulse upon the transition of the comparator input, the pulse generated by the one-shot circuit forming the encoded pulse position modulated signal.

9. A system for simultaneously transmitting a plurality of audio signals as defined in claim 1 wherein the transmitter means comprises a device emitting electromagnetic energy of a frequency in the range from $10^{12}$ Hz to $10^{16}$ Hz.

10. A system for simultaneously transmitting a plurality of audio signals as defined in claim 1 wherein the transmitter means comprises at least one infrared emitting diode.

11. A system for simultaneously transmitting a plurality of audio signals as defined in claim 1 wherein the transmitter means comprises a plurality of infrared emitting diodes.

12. A system for simultaneously transmitting a plurality of audio signals as defined in claim 1 wherein the transmitter means comprises a plurality if infrared emitting diodes within said enclosed space.

13. A system for simultaneously transmitting a plurality of audio signals as defined in claim 1 wherein the transmitter means comprises a plurality of infrared emitting diodes distributed at a plurality of sites within said enclosed space, at least one infrared emitting diode being located at each site.

14. A system for simultaneously transmitting a plurality of audio signals as defined in claim 1 wherein the reception means comprises at least one photodetection device.

15. A system for simultaneously transmitting a plurality of audio signals as defined in claim 14 wherein the photodetection device comprises a photodiode.

16. A system for simultaneously transmitting a plurality of audio signals as defined in claim 1 further comprising means for inserting a sync pulse in the encoded pulse position modulated signal to form an encoded composite signal.

17. A system for simultaneously transmitting a purality of audio signals as defined in claim 1 further comprising means for processing the received pulse position modulated signal.

18. A system for simultaneously transmitting a plurality of audio signals as defined in claim 17 wherein the means for processing comprises means for isolating a sync pulse from a composite signal.

19. A system for simultaneously transmitting a plurality of audio signals as defined in claim 1 wherein the selection means comprises:
- an oscillator;
- a counter circuit driven by the oscillator;
- a gate circuit which is adapted for allowing passage of a portion of the received composite signal; and
- a user adjustable channel selection device adapted for passing one output of the counter circuit to the gate.

20. A system for simultaneously transmitting a plurality of audio signals as defined in claim 1 further comprising second conversion means for converting the received pulse position modulated signal into a corresponding pulse amplitude modulated signal.

21. A system for simultaneously transmitting a plurality of audio signals as defined in claim 1 wherein the means for extracting the audio information comprises a low pass filter.

22. A system for simultaneously transmitting at least two audio signals from a first point to a second point, the first and second points located within a transmission space and spatially distinct from each other, the system comprising:
- inputting means for simultaneously receiving and inputting the first and second electrical audio signals to the system;
- two low pass filters, each low pass filter adapted for filtering out frequencies above a first frequency from the first and second audio signals;
- two limiter circuits, each limiter circuit adapted for limiting the amplitude of one of the first and second audio signals;
- multiplexing means for time-division multiplexing the plurality of audio signals into a time-division multiplexed signal wherein each audio signal is allocated one of a sequence of periodic time slots to form an encoded pulse amplitude modulated signal, the time slots of the pulse amplitude modulated signal including information sampled from the first and second audio signals;
- first conversion means for converting the encoded pulse amplitude modulated signals into an encoded pulse position modulated signal, said pulse position modulated signal comprising a serial pulse train;
- means for inserting a sync pulse into the pulse position modulated signal, each frame of the pulse position modulated signal having at least one time slot for each audio signal and at least one sync pulse;
- means for driving at least one light emitting diode with the encoded pulse position modulated signal;
- at least one light emitting diode adapted for broadcasting an optical signal into the transmission space, the optical signal corresponding to the serial pulse train of the encoded pulse position modulated signal;
- at least one photodetection device which is adapted to translate the optical signal into a corresponding received pulse position modulated signal;
- selection means for selecting a first time slot from each frame of the received pulse position modulated signal;
- second conversion means for converting the received pulse contained in the first time slot into an audio signal to be presented to a user;
- a portable power supply adapted for powering the photodetection device, the second conversion means, and the selection means; and
- a housing containing the portable power supply, the photodetection device, the second conversion means, and the selection means, such that a user of the system may change location within the transmission space and have access to at least the two audio signals.

23. A system for simultaneously transmitting at least two audio signals as defined in claim 22 wherein the multiplexing means comprises:
- an analog multiplexer having at least as many inputs as audio signals in the plurality of audio signals, said analog multiplexer including means for sequentially passing each one of the radio signals to its output; and
- oscillator means for driving the analog multiplexer such that each of the plurality of audio signals are periodically sampled.

24. A system for simultaneously transmitting at least two audio signals as defined in claim 23 wherein the oscillator means comprises an oscillator circuit and a counter circuit, the counter circuit being driven by the oscillator circuit and the counter circuit outputs driving the analog multiplexer causing the sequential passing of each of the audio signals to the analog multiplexer output for one time slot thereby generating the encoded pulse amplitude modulated signal.

25. A system for simultaneously transmitting at least two audio signals as defined in claim 22 wherein the first conversion means comprises:
- a comparator having first and second inputs;
- a ramp generator, the ramp generator output being triggered substantially at the beginning of a time slot, the ramp generator output being applied to a second input to the comparator, the first input to the comparator receiving the encoded pulse amplitude modulated signal; and
- a one-shot circuit adapted for receiving the output of the comparator and generating a pulse upon the transition of the comparator output, the pulse generated by the one-shot circuit forming the encoded pulse position modulated signal.

26. A system for simultaneously transmitting at least two audio signals as defined in claim 22 wherein the light-emitting device comprises a device emitting electromagnetic energy of a frequency in the range from $10^{12}$ Hz to $10^{16}$ Hz.

27. A system for simultaneously transmitting at least two audio signals as defined in claim 26 wherein the light-emitting device comprises at least one infrared emitting diode.

28. A system for simultaneously transmitting at least two audio signals as defined in claim 22 further comprising a plurality of infrared emitting diodes.

29. A system for simultaneously transmitting at least two audio signals as defined in claim 22 further comprising a plurality of infrared emitting diodes distributed at a plurality of sites within the transmission space, at least one infrared emitting diode being located at each site.

30. A system for simultaneously transmitting at least two audio signals as defined in claim 22 wherein the photodetection device comprises a photodiode.

31. A system for simultaneously transmitting at least two audio signals as defined in claim 22 wherein the selection means comprises:
- an oscillator;
- a counter circuit driven by the oscillator;
- a gate adapted for allowing passage of a portion of the received composite signal; and
- a user adjustable channel selection device adapted for passing one output of the counter circuit to the gate.

32. A system for simultaneously transmitting at least two audio signals as defined in claim 22 wherein the second conversion means further comprises means for converting the received pulse position modulated signal into a received pulse amplitude modulated signal.

33. A system for simultaneously transmitting at least two audio signals as defined in claim 22 further comprising headphones for receiving the audio signal from the second conversion means.

34. A system for simultaneously transmitting at least two audio signals as defined in claim 22 further comprising means for attaching the housing to a user's body.

35. A system for receiving at least a first and a second audio signal comprising:
- means for receiving a broadcast optical signal carrying a time multiplexed pulse position modulated signal, the carried pulse position modulated signal comprising a plurality of time slots, at least some of the time slots containing pulses, the positions of the pulses within each corresponding time slot indicating the amplitude of sampled portions of the first and second audio signals, the means for receiving an optical signal including means for translating the optical signal into a received pulse position modulated signal comprising a plurality of time slots containing pulses positioned therein so as to correspond to the pulse positions of the carried pulse position modulated signal;
- means for selecting a time slot from the received pulse position modulated signal;
- means for converting the pulse position information of said selected time slot so as to reproduce therefrom one of said first and second audio signals; and
- means for presenting the audio signal to a user.

36. A system as defined in claim 35 wherein the means for receiving an optical signal comprises a plurality of infrared photodiodes.

37. A system as defined in claim 35 further comprising a housing containing the means for receiving, converting, selecting, and extracting.

38. A system as defined in claim 35 further comprising means for converting the received pulse position modulated signal into a corresponding pulse amplitude modulated signal having a plurality of corresponding time slots.

39. A system as defined in claim 35 wherein the means for presenting the audio information to a user comprises headphones connected to the means for extracting.

40. A method for cablelessly conveying of a plurality of audio signals from a first point through space to a second point, the method comprising the steps of:
- generating a time multiplexed encoded pulse amplitude modulated signal incorporating information from all of the plurality of audio signals;
- converting the encoded pulse amplitude modulated signal into a corresponding encoded pulse position modulated signal;
- applying the pulse position modulated signal to at least one light emitting device to generate an optical signal;
- broadcasting the optical signal into space;
- receiving the optical signal by a photodetection device and generating a received pulse position modulated signal;
- selecting a portion of the received pulse position modulated signal, said selected portion containing audio information corresponding to one of the plurality of audio signals; and
- extracting the audio information from the selected portion of the pulse position modulated signal to reconstruct therefrom at least one of the audio signals.

* * * * *

UNITED STATES PATENT AND TRADEMARK OFFICE
CERTIFICATE OF CORRECTION

PATENT NO. : 4,959,828

DATED : September 25, 1990

INVENTOR(S) : LAWRENCE C. AUSTIN

It is certified that error appears in the above-identified patent and that said Letters Patent is hereby corrected as shown below:

```
Column 1, line 36, "beind" should be --being--
Column 9, line 58, "purality" should be --plurality--
Column 15, line 7, "transmitter." should be --transmitters.--
Column 15, line 68, "disabled" should be --disable--
Column 16, line 46, "if" should be --is--
Column 16, line 67, "each" should be --ease--
Column 18, line 4, "ampllifier" should be --amplifier--
Column 20, line 17, "cna" should be --can--
Column 20, line 24, "communications" should be --communication--
Column 20, line 65, "pats" should be --parts--
Column 26, line 27, "input" should be --output--
Column 26, line 45, "if" should be --of--
Column 26, lines 65-66, "purality" should be --plurality--
Column 30, line 19, delete "of"
```

Signed and Sealed this

Fourth Day of August, 1992

Attest:

DOUGLAS B. COMER

*Attesting Officer*        *Acting Commissioner of Patents and Trademarks*